United States Patent [19]
Garney

[11] Patent Number: 5,404,494
[45] Date of Patent: * Apr. 4, 1995

[54] SYSTEM FOR COPYING DEVICE DRIVER STUB INTO ALLOCATED PORTION OF SYSTEM MEMORY CORRESPONDING TO RECEIVING RESOURCE TO ENABLE DEVICE DRIVER EXECUTION FROM RESOURCE MEMORY

[75] Inventor: John I. Garney, Aloha, Oreg.

[73] Assignee: Intel Corporation, Santa Clara, Calif.

[ * ] Notice: The portion of the term of this patent subsequent to Jun. 7, 2011 has been disclaimed.

[21] Appl. No.: 7,580

[22] Filed: Jan. 22, 1993

Related U.S. Application Data

[63] Continuation-in-part of Ser. No. 815,331, Dec. 27, 1991, Pat. No. 5,319,751.

[51] Int. Cl.[6] .............................................. G06F 15/40
[52] U.S. Cl. .................................... 395/500; 395/700; 364/231.5; 364/231.6; 364/247.3; 364/DIG. 1
[58] Field of Search ................ 395/275, 200, 375, 650, 395/700, 500; 364/231.5, 231.6, 247.3

[56] References Cited

U.S. PATENT DOCUMENTS

| | | | |
|---|---|---|---|
| 4,589,063 | 5/1986 | Shah et al. | 364/200 |
| 4,905,182 | 2/1990 | Fikh et al. | 364/900 |
| 5,029,077 | 7/1991 | Fatahalian et al. | 364/200 |
| 5,109,510 | 4/1992 | Baker et al. | 395/650 |
| 5,247,682 | 9/1993 | Kondou et al. | 395/700 |
| 5,265,252 | 11/1993 | Rawson et al. | 395/700 |
| 5,319,751 | 6/1994 | Garney | 395/200 |

OTHER PUBLICATIONS

"Subnotebook modem runs over 15 hours", Tuesday, Nov. 17, 1992, *COMDEX Daily*, p. 22.
Device Driver 'Stubs' Smooth path to TOP SCSI performance by Gibson Steve, Nov. 19, 1990

*Primary Examiner*—Thomas C. Lee
*Assistant Examiner*—Moustafa Mohamed Meky
*Attorney, Agent, or Firm*—Blakely, Sokoloff, Taylor & Zafman

[57] ABSTRACT

Device drivers for removable system resources are configured dynamically in a computer system which has a processor, a system memory and an interface for receiving removable system resources (generally denoted feature cards). A feature card includes a card memory area that stores a device driver for controlling the feature card. The feature card device driver is separated into two parts: 1) a full device driver portion, and 2) a stub device driver portion. The full device driver provides all of the device driver functionality necessary to control each and every function of the feature card. The device driver stub is a small compact portion of processing logic for linking the full device driver with operating system software located in the computer system. There is an upper bound for the size of a device driver stub of a given feature card. Any system will have a known number of card slots. Therefore, by allocating enough space per slot in computer system memory to contain the largest permitted card device driver stub, one can ensure that there will always be enough computer system memory to contain every device driver stub required by the system at a given time.

20 Claims, 17 Drawing Sheets

DEVICE DRIVER INFORMATION
BLOCK (DDIB) HEADER

STUB HEADER
-540-

| DEVICE DRIVER LINKAGE INFORMATION | -630 |
| DEVICE DRIVER ATTRIBUTE INFORMATION | -632 |
| DEVICE DRIVER STRATEGY OFFSET | -634 |
| DEVICE DRIVER INTERRUPT OFFSET | -636 |
| DEVICE DRIVER UNITS AND NAME | -638 |

*Figure 6c*

STUB DATA
-542-

| ADAPTER IDENTIFICATION | -664 |
| SOCKET IDENTIFICATION | -666 |
| DEVICE DRIVER STUB UNIQUE IDENTIFICATION | -668 |
| CARD INSERTION FLAG | -672 |
| DRIVER SPECIFIC DATA AREA | -674 |

*Figure 6d*

SYSTEM FOR COPYING DEVICE DRIVER STUB INTO ALLOCATED PORTION OF SYSTEM MEMORY CORRESPONDING TO RECEIVING RESOURCE TO ENABLE DEVICE DRIVER EXECUTION FROM RESOURCE MEMORY

RELATED APPLICATIONS

This application is a Continuation-in-part of U.S. patent application Ser. No. 07/815,331, filed Dec. 27, 1991, now U.S. Pat. No. 5,319,751, and entitled "Device Driver Configuration In a Computer System". The disclosure of the parent application, Ser. No. 07/815,331, filed Dec. 27, 1991, is hereby incorporated fully by reference.

BACKGROUND OF THE INVENTION

This application is related to: U.S. patent application Ser. No. 08/007,849, filed Jan. 22, 1993 (still pending), entitled "Reusing Device Driver Stubs to Support Access to Removable Computer Cards", which is hereby incorporated fully by reference.

1. Field of the Invention

The present invention pertains to the field of computer systems. Specifically, the present invention relates to computer systems supporting an interface to removable system resources and the control of device drivers related thereto.

2. Art Background

It is becoming increasingly important to design and build computer systems that can be dynamically configured without powering down the computer system or requiring the operating system program logic to be reset or bootstrap initialized. Dynamic configuration includes the ability to add or remove system resources or special feature capabilities while a computer system is operating. These system resources and special features include expansion memory boards, parallel or serial input/output (I/O) ports, read only memory (ROM) or flash memory expansion boards, computer network interface cards, modem cards, smart cards, or other removable system resources or special feature mechanisms.

Such removable system resources and special features are often implemented in the prior art using removable electronic feature cards adhering to the Personal Computer Memory Card International Association (PCMCIA), Sunnyvale, Calif., Release 2.0 standard. These PCMCIA feature cards generally comprise electronic microcircuits within a thin housing including a detachable multiple conductor interface with which the feature card may be removably inserted into a slot in a computer housing. Once inserted, a feature card is accessible to and used by the processor in the computer system. The use of feature cards allows a computer user to select specific features or resources from a variety of feature cards offered by a computer vendor. In this way, the computer user achieves the desired level of functionality without being required to purchase unnecessary resources or computer system capabilities. The overall cost of the computer system for a specific application is thereby optimized. The use of removable feature cards is particularly significant for portable computers or lap top computers where space constraints increase the need for system resource optimization. The design and use of hardware devices under the PCMCIA standard are well known in the art. It will be apparent to those skilled in the art that other implementations of removable system resources are possible.

Virtually all computer systems operate with some sort of operating system or software processing logic. The use of an operating system in a computer system is well-known in the art. The operating system is responsible for managing the processing and transfer of information between various system resources. One well known technique for managing these resources is the use of device drivers. Device drivers are software modules comprising processing logic for controlling the low level or device specific components of a particular computer system resource. For example, a device driver may be used for controlling a magnetic disk drive device coupled to a computer system. In this example, the device driver would control the various hardware specific registers, latches, signals, or other components of the magnetic disk drive device. Similarly, other computer system resources such as serial or parallel input/output (I/O) ports, modem devices, computer network interface devices, or memory expansion boards are controlled by device drivers.

In conventional computer systems, device drivers are typically loaded into random access memory (RAM) during bootstrap initialization of the computer system. Many prior art computer systems require that device drivers be loaded at initialization time in order for random access memory to be allocated properly. Depending upon the complexity of the device controlled by the device driver, the device driver itself may be relatively small or a very large device driver that consumes many thousands of bytes of random access memory. Thus, many prior art systems require that a full system configuration of resources be installed and available at bootstrap initialization time. If system resources or interfaces are subsequently added or removed from the system, the inability to access a newly installed resource or the errant access to a now unavailable system resource usually results. Other prior art computer systems require that the computer system be powered down while new system resources or features are added or removed from the system. Still other systems must at least be newly bootstrap loaded in order to gain access to a new configuration of system resources. Thus, prior art computer systems cannot be readily reconfigured to a new arrangement of system resources.

Because prior art systems typically require that a full system configuration of resources be established at initialization time, the tendency exists for any or all system resources that may conceivably be used while a computer system is powered up to be installed during the initialization process. This tendency leads to the installation of resources that are never used during a computing session. The loading and installation of unused system resources increases the time required for bootstrap initializing the system and reduces the available random access memory (RAM), because of the RAM space required by unused device drivers. It is, therefore, important to install in a computer system only those device drivers actually needed during a computing session. In some cases, it may not be possible to load all of the device drivers necessary because of the random access memory storage constraints.

Some computer systems in the prior art provide means for interfacing with removable electronic feature cards. In order to mitigate the disadvantages described above, some of these computer systems store associated device drivers on the removable electronic feature card itself. In this way, random access memory space within the computer system does not need to be allocated for storage of the device driver. Moreover, processing time during initialization is not consumed by having to load the device driver into random access memory. Systems that configure device drivers on the removable feature cards have the advantage of optimizing memory allocation requirements within the computer system.

Systems that configure device drivers on removable feature cards, however, have several important disadvantages. First, if a feature card is removed from the computer system, the device driver controlling the operation of the feature card becomes inaccessible to the computer system. In most cases, the computer system requires access to a device driver in order to properly terminate the operation of the device prior to removal of the feature card. Typically, the computer system does not have sufficient time to access the device driver prior to removal of the feature card. Thus, system errors often result from an improperly terminated system resource.

Other computer systems having means for interfacing with removable electronic feature cards provide a very limited capability for responding to insertion or removal of feature cards during post initialization operation of the computer system. Some computer systems do not recognize system resources connected to the computer system after the bootstrap initialization process has been completed. Other computer systems suspend or freeze the operation of the computer system if a system resource is removed after initialization is complete. Still other computer systems require that the system be powered down or the bootstrap initialization process be reinitiated if a new configuration of system resources is desired.

This application is a continuation-in-part of U.S. patent application Ser. No. 07/815,331, filed Dec. 27, 1991, and entitled "Device Driver Configuration In a Computer System". The disclosure of the parent application, Ser. No. 07/815,331, described a computer system having dynamic device driver configuration for removable system resources. In the computer system of the parent application, a feature card device driver is stored in a memory area of the card. The device driver is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the full device driver with operating system software located in the computer system.

Upon insertion of a card into the computer system, the device driver stub code image is read from the card memory area and transferred into an area of computer system memory. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver and allows memory mapping to the full device driver. The full device driver may then be activated by the processor.

When a card is removed from the computer system, the device driver stub disables access to the removed card by disallowing memory mapping to the removed card. The card insertion flag is reset to indicate that the removable system resource has been decoupled from the computer system and the device driver stub is unlinked from the linked list of active device driver stubs.

However, in the invention of the parent application, each device driver stub loaded into computer system memory remains resident in the computer system memory until the next time the system is bootstrap initialized. Therefore, while the invention of the parent application permits dynamic device driver configuration for removable computer system resources, the fact that the computer system has a finite amount of system memory places an upper limit upon the number of removable resources that can be used by the system before the system must be reset with a bootstrap initialization operation. The requirement that a system be reset is an undesirable feature because a system cannot be used while a bootstrap initialization is being performed. Furthermore, a bootstrap initialization operation destroys the contents of computer system memory. Therefore, any data residing in main memory will be lost if it had not been saved prior to the bootstrap operation.

Thus, a better means for dynamically configuring system resources in a computer system is needed.

SUMMARY OF THE INVENTION

A method and apparatus for a computer system having dynamic device driver configuration for removable system resources is disclosed. The computer system comprises a processor, a system memory and an interface for receiving removable system resources. These system resources and special features include expansion memory boards, parallel or serial input/output (I/O) ports, read only memory (ROM) or flash memory expansion boards, computer network interface cards, modem cards, smart cards, or other removable system resources or special feature mechanisms (generally denoted feature cards or cards).

A feature card includes a card memory area. The card memory area includes software for controlling the remaining card specific functionality. The software within the card memory area, including both data and processing logic, includes a device driver for controlling the feature card. The feature card device driver is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the full device driver with operating system software located in the computer system.

The card memory area comprises a device driver information block (DDIB) header, a device driver stub code image, and full device driver code. The device driver information block header comprises information used for linking the device driver with other device drivers and computer system processing logic. The device driver stub code image comprises a compact portion of processing logic and data that is copied into computer system memory upon insertion of a feature card into the computer system. The full device driver code remains card resident.

In order to avoid the problems encountered in the prior art, the present invention exploits the fact that a typical system has more removable feature cards than feature card slots. In this paradigm, feature cards are swapped in and out of the system as needed. Thus, when every slot is occupied by a feature card, and a different feature card is needed, a feature card which is no longer needed is removed to permit the needed feature card to be added to the system.

In the present invention, there is an upper bound for the size of a device driver stub of any given feature card. If the feature card has more than one function that would otherwise use more than one device driver stub, the multiple device driver stubs can be combined into one and then the upper bound applies to the size of the combined device driver stub for the card. Any system will have a known amount of card slots. Therefore, by allocating enough space per slot in computer system memory to contain the upper bound size of the largest permitted card device driver stub, one can ensure that there will always be enough computer system memory to contain every device driver stub required by the system at a given time.

Upon insertion of a card into a slot of the computer system, the device driver stub code image is read from the card memory area and transferred into an area of computer system memory reserved for the particular slot. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver and allows memory mapping to the full device driver. The full device driver may then be activated by the processor.

The DDIB header comprises a set of information for linking the card device driver in a linked list with other device drivers and with the operating system logic executing within the computer system. By traversing the linked list, a particular device driver may be located by the operating system. Upon insertion of a card into a particular slot, it is determined whether the device driver stub already resides in the area of the computer system memory reserved for the particular slot. If so, the operation of copying the device driver stub into computer system memory is prevented from occurring. As a card is inserted, a card insertion flag is set to indicate that the removable system resource is coupled to the computer system.

When a card is removed from the computer system, the device driver stub associated with the removed card is executed. The device driver stub disables access to the removed card by disallowing memory mapping to the removed card. The card insertion flag is reset to indicate that the removable system resource has been decoupled from the computer system.

BRIEF DESCRIPTION OF THE DRAWINGS

The objects, features, and advantages of the method and apparatus of the present invention will be apparent from the following detailed description of the invention in which:

FIG. 6c illustrates the content of a stub header.

FIG. 6d illustrates the content of the stub data area.

DETAILED DESCRIPTION OF THE INVENTION

The present invention is a computer system having a method and circuitry for dynamically configuring device drivers of removable system resources. In the following description, numerous specific details are set forth in order to provide a thorough understanding of the present invention. However, it will be apparent to one of ordinary skill in the art that these specific details need not be used to practice the present invention. In other circumstances, well known structures, circuits, and interfaces have not been shown in detail in order not to obscure unnecessarily the present invention.

Figure 1:
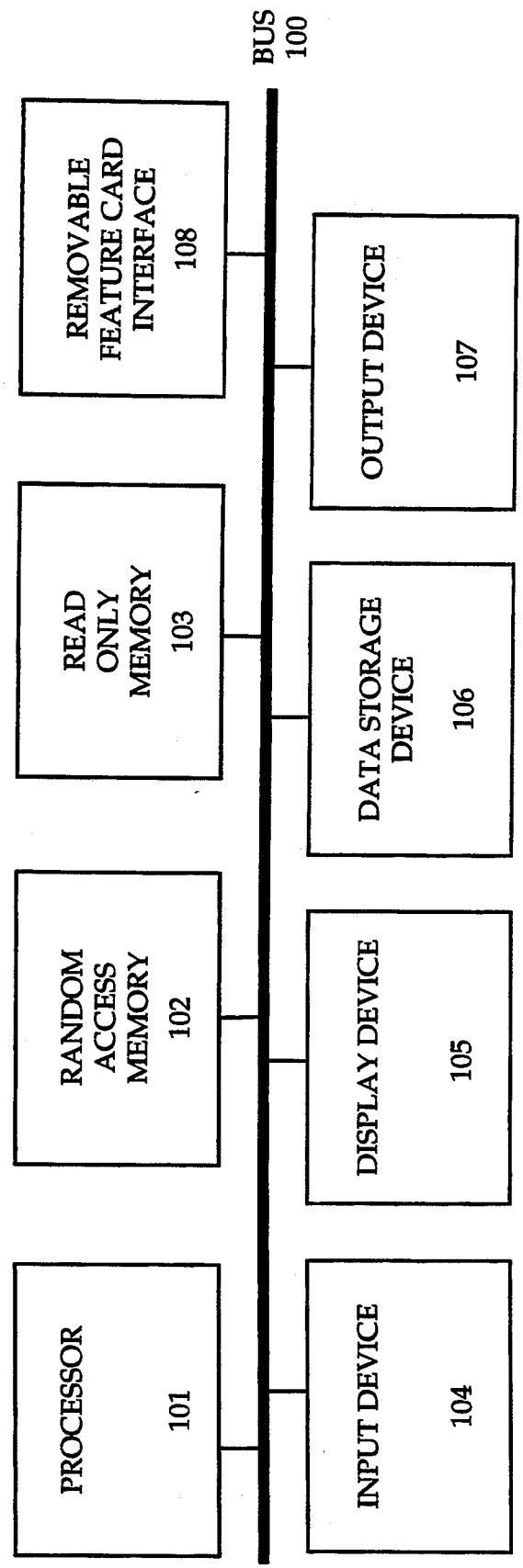
FIG. 1 is a block diagram of the architecture of a computer system in which the present invention operates.

Referring now to FIG. 1, a block diagram of the computer system in which the present invention operates is illustrated. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, and a random access memory device 102 coupled with the bus 100 for storing information and instructions for processor 101. The processing logic of the present invention is typically stored in a device such as random access memory 102 and executed therefrom by processor 101. In addition, a typical computer system may optionally include other system resources including a read only memory device 103 coupled with the bus 100, an input device 104 such as an alphanumeric input device or a cursor control device coupled to the bus 100 for communicating information and command selections to the processor 101, a display device 105 such as a video display terminal or a liquid crystal display device coupled to the bus 100 for displaying information to a computer user, a data storage device 106 such as a magnetic disk and disk drive coupled with the bus 100 for storing information and instructions, an output device 107 such as a printer or facsimile apparatus coupled to the bus 100 for communicating information to a destination external to the computer system, and a removable electronic feature card interface 108 for electrically removably coupling an electronic circuit card to bus 100.

Removable feature cards which may be removably inserted into interface 108 generally comprise electronic microcircuits within a thin housing including a detachable multiple connector interface with which the feature card may be removably inserted into a slot in a computer system housing. In one embodiment, the feature cards and feature card interface 108 used with the present invention adhere to the PCMCIA release 2.0 standard for electronic feature cards. Feature cards of this form are well known to those of ordinary skill in the art.

Figure 2:
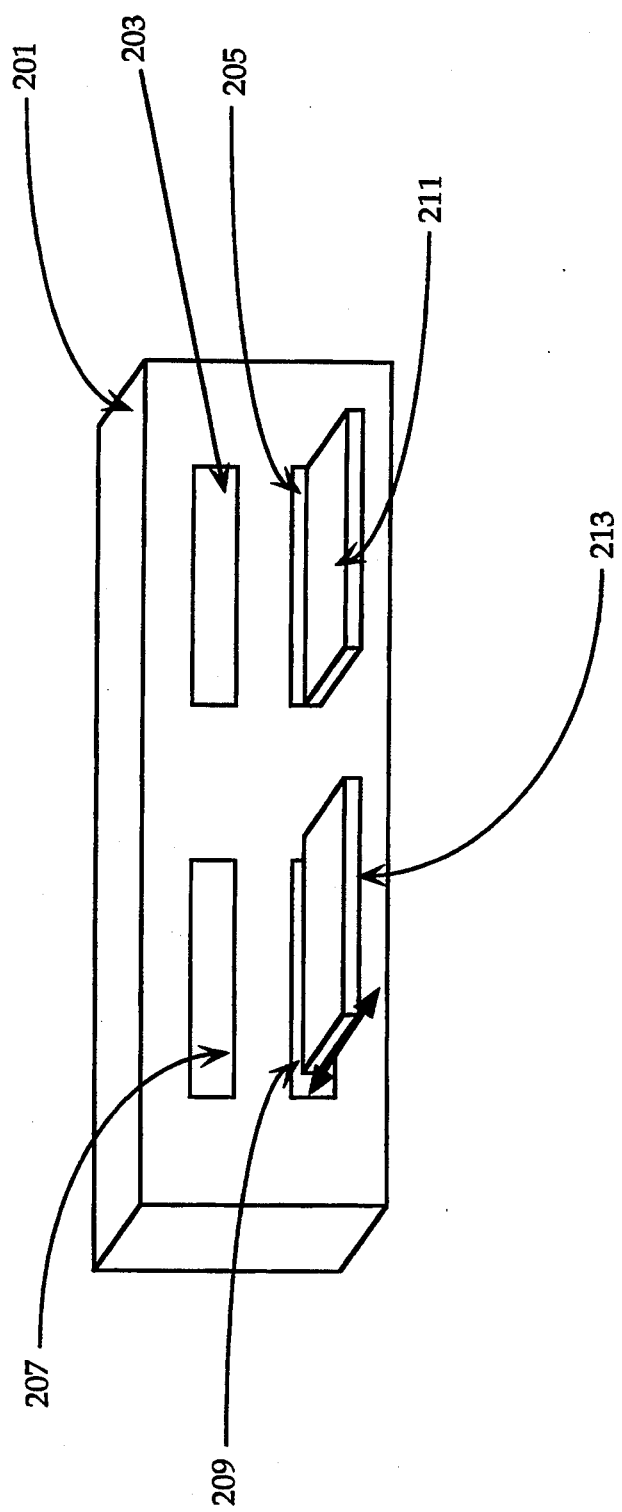
FIG. 2 is an example of a computer housing containing a plurality of feature card insertion slots.

Referring now to FIG. 2, an illustration of a computer system housing having a plurality of feature card interfaces (203, 205, 207, and 209) is illustrated. As shown, feature cards 211 and 213 may be removably inserted and thereby electrically coupled to an interface 108 within the computer system. This feature card structure facilitates the convenient insertion and/or removal of feature cards during the course of a computing session.

Figure 3:
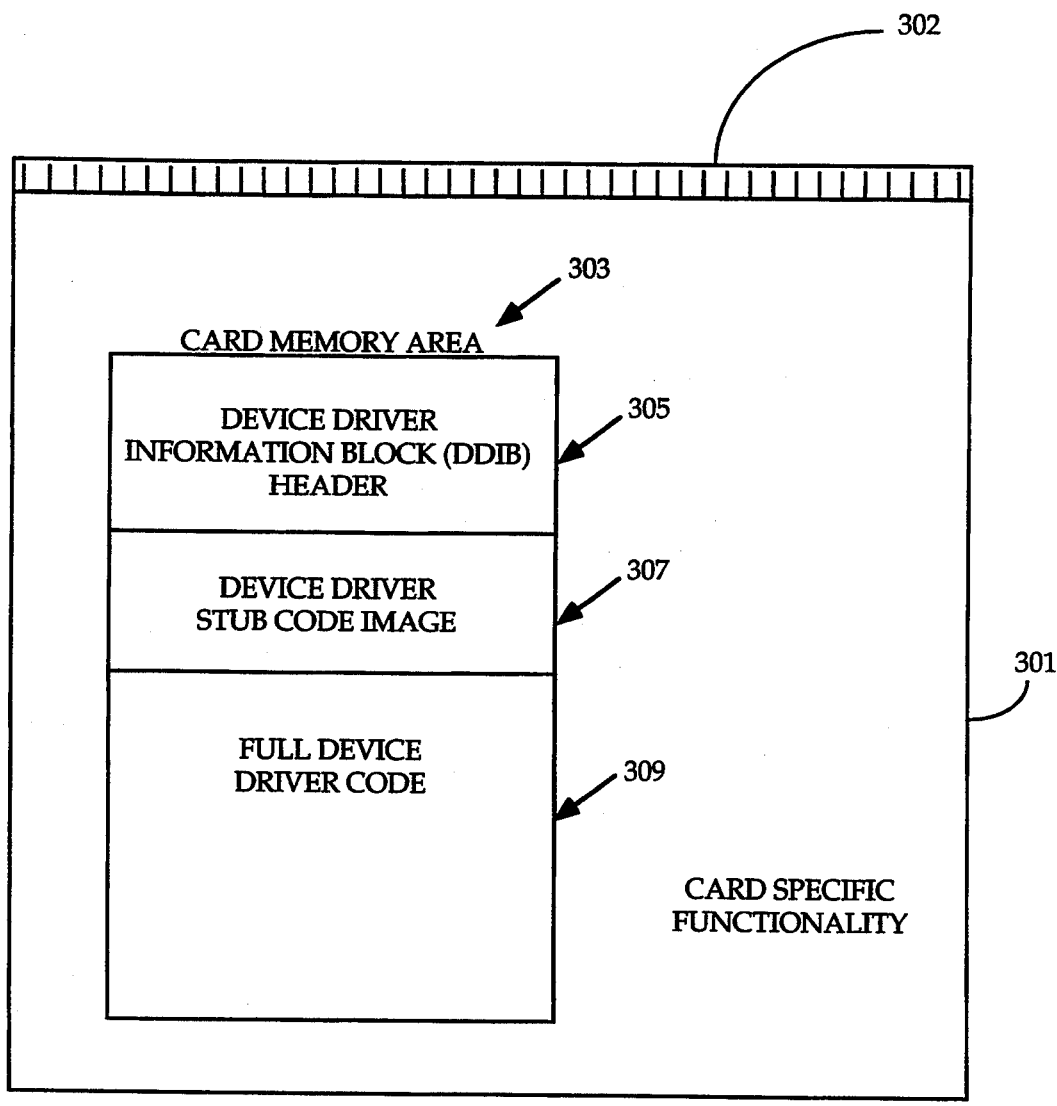
FIG. 3 is a block diagram of the contents of a removable electronic feature card.

Referring now to FIG. 3, the structure of a typical feature card 301 is illustrated. Feature card 301 includes an interface 302 with which the feature card 301 may be removably electrically coupled to a computer system. Feature card 301 also includes a card memory area 303. Card memory area 303 includes software for controlling the remaining card specific functionality. This software within card memory area 303, including both data and processing logic, includes a device driver for controlling the operation of the feature card.

As described above, it is convenient to store the device driver for a feature card on the feature card itself. Using this technique, RAM space within the computer system does not need to be provided for the card device driver and processing time is not consumed in transferring a device driver from the card to computer system RAM. Maintaining the card device driver on the card itself also achieves the advantage of assuring that the device driver is always compatible with the card specific functionality. There is less chance for a mismatch between the device driver stored in the computer system and the card specific functionality provided on the card.

In order to avoid the problems encountered in the prior art, the feature card device driver of the present invention is separated into two parts: 1) a full device driver portion, and 2) a stub device driver portion. The full device driver provides all of the device driver functionality necessary to control each and every function of the feature card. The device driver stub is a small compact portion of processing logic associated with the full device driver but mainly responsible for linking the card resident full device driver to operating system software located in the computer system. The device driver stub is copied into and executed from computer system random access memory. Conversely, the full device driver remains resident on the feature card and is executed therefrom. Because the device driver stub for each feature card is a compact processing logic block, many such device driver stubs for different feature cards may be stored in computer system random access memory without consuming excessive amounts of computer system RAM. This configuration allows a large number of device driver stubs to be resident in computer system memory without having to allocate computer system RAM for the full device driver for each feature card.

In the present invention, a maximum size constraint is placed upon the size of a device driver stub for a given card. Thus, the device driver stub cannot exceed the maximum size constraint. The number of slots for a given system will be known (or can be determined) at bootstrap initialization. Also, the number of slots is a constant for any system session and no slot will contain more than one card at a given time. Therefore, at bootstrap initialization, it is possible to specify the amount of system memory to set aside for device driver stubs. By allocating the maximum size permitted for the device driver stub of a card for each slot of the system, a relatively small, but adequate, amount of system memory is set aside for device driver stubs. Therefore, cards may be added to and removed from the system without fear that the amount of system memory set aside for device driver stubs will prove inadequate (thereby forcing reset of the system by a bootstrap initialization).

Figure 4:
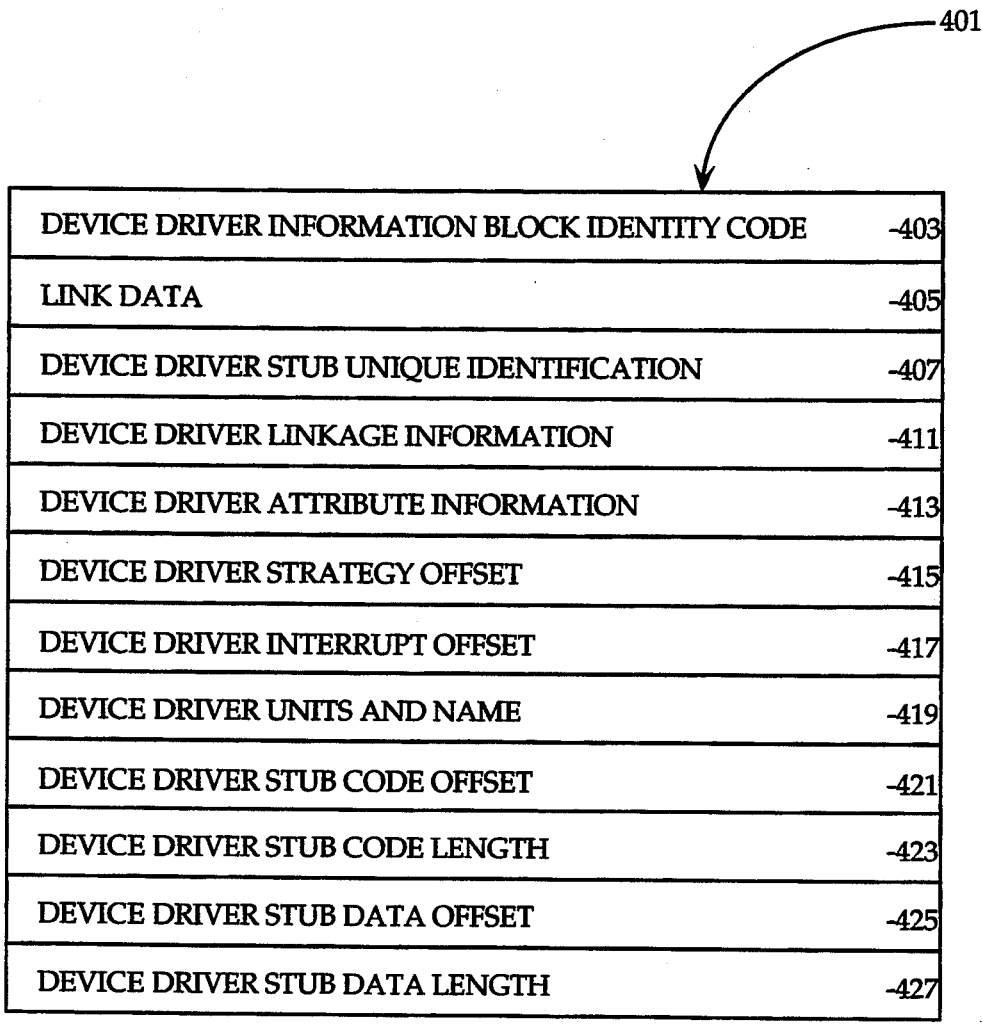
FIG. 4 illustrates the content of the Device Driver Information Block Header.

Referring again to FIG. 3, card memory area 303 comprises device driver information block (DDIB) header 305, device driver stub code image 307, and full device driver code 309. Device driver information block header 305, comprises information used for linking the device driver with computer system processing logic. The content and structure of device driver information block header 305 is illustrated in FIG. 4 and described below. Card memory area 303 also comprises the device driver stub code image 307 which is copied to computer system memory and the full device driver code 309 which remains card resident.

Upon insertion of card 301 into a particular slot of the computer system, the device driver stub code image 307 is read from card memory area 303 and transferred into an area of computer system memory 102 set aside for the particular slot. The device driver stub code is then executed by the processor of the computer system from computer system random access memory. Conversely, full device driver code 309 is not transferred to the computer system random access memory; rather the full device driver is executed while still resident on card 301. Upon execution, the device driver stub enables access to the full card resident device driver 309 and allows memory mapping to the full device driver 309. The full device driver 309 may then be activated by the processor 101.

Referring now to FIG. 4, the content and structure of the device driver information block (DDIB) header is illustrated. DDIB header comprises a set of information for linking the card device driver with operating system logic executing within the computer system.

DDIB header comprises a device driver information block identity code 403 that identifies the remaining information as being part of a DDIB header. Link data field 405 is used for linking the DDIB with other DDIBs (not shown) in the card memory area 303. Device driver stub unique identification 407 is a unique value that identifies the device driver stub and distinguishes the device driver stub from all other device driver stubs. Device driver stub data size 409 specifies the size of a RAM data area required by this device driver stub.

The next five DDIB header fields (i.e. fields 411, 413, 415, 417, and 419) are all the same values contained within a standard operating system device driver header. Specifically, these five parameters are contained within the DOS (Disk Operating System developed by Microsoft, Corp., Redmond, Wash.) device driver header which is well known to those of ordinary skill in the art. Device driver linkage information 411, device driver attribute information 413, and device driver units and name 419 comprise device driver identification and linkage information used by the operating system to identify and link with the corresponding device driver. The device driver strategy offset 415 and device driver interrupt offset 417 contain the offset from the beginning of the device driver stub code area. These fields are modified by the operation of the present invention as will be described below. Device driver stub code offset 421 and device driver stub code length 423 provide a means by which the computer system processing logic may determine the location and size of the device driver stub code segment resident on the feature card. Similarly, device driver stub data offset 425 and device driver stub data length 427 provide a means for determining the location on the feature card and the size of the device driver stub data area. Knowing the location and size of the code and data areas for the device driver stub, operating system logic within the computer system can transfer the device driver stub code and data areas from the feature card into computer system random access memory.

Figure 5:
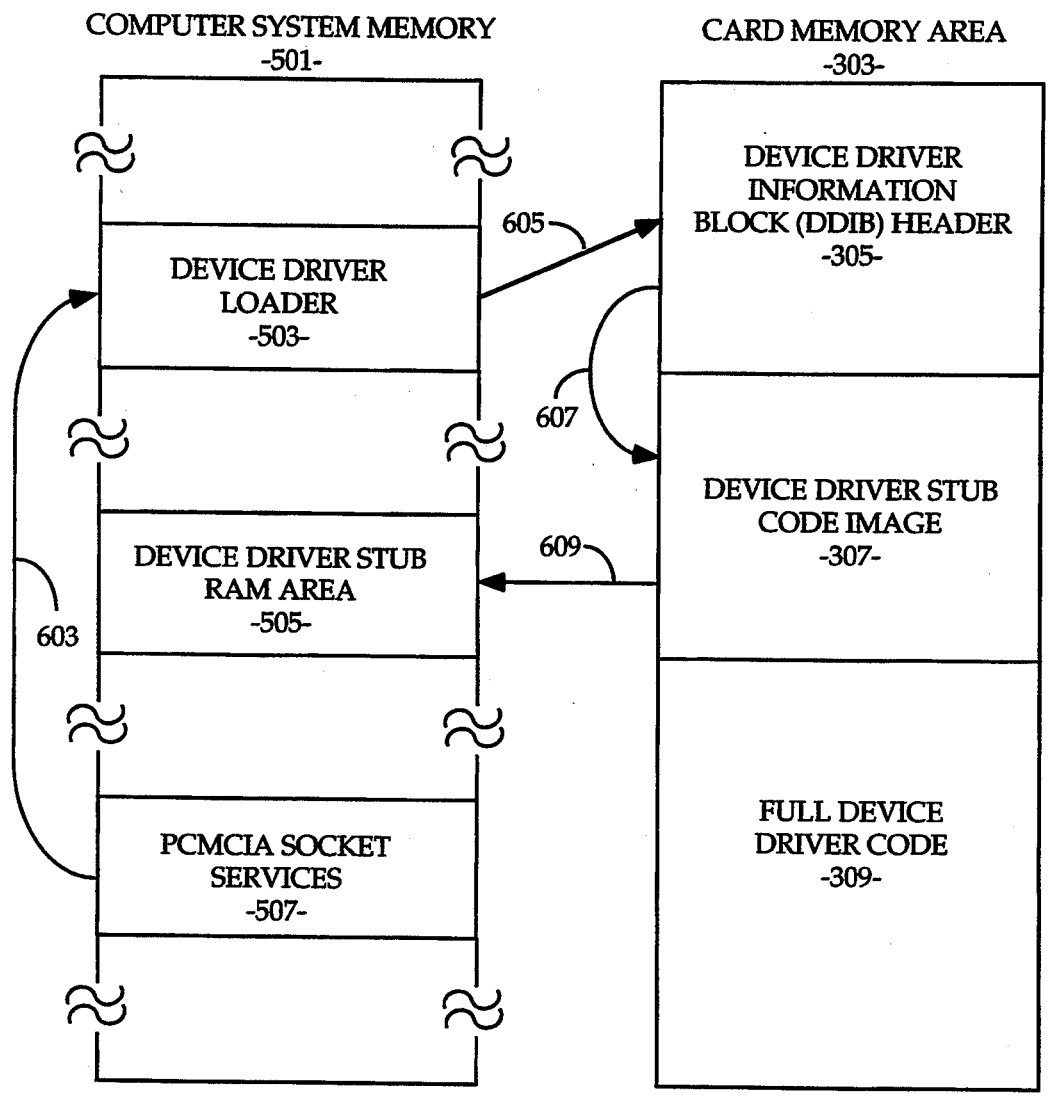
FIG. 5 illustrates the content of computer system memory as related to the content of the feature card memory.

Referring now to FIG. 5, a portion of computer system memory 501 residing within random access memory 102 is illustrated. Computer system memory portion 501 comprises device driver loader 503, device driver stub RAM area 505, and PCMCIA socket services 507. Device driver loader 503 comprises processing logic for loading and dispatching the appropriate device driver on initialization of the computer system and when a card is inserted or removed (i.e. a card insertion or removal event) from the computer system. The details of the processing performed by the device driver loader 503 of one embodiment is described in more detail in connection with the flow charts of FIGS. 7 and 8. Device driver stub RAM area 505 comprises a memory area used for the storage of device driver stubs that are either loaded during computer system initialization time or loaded upon the insertion of a card into the computer system. The content of device driver stub RAM area 505 is described in more detail in connection with FIGS. 6a and 6b. PCMCIA socket services 507 comprises processing logic for handling low level control of card insertion and removal events. Processing logic within PCMCIA socket services 507 receives interrupts upon the detection of a card insertion or removal event. Processing logic corresponding to the function carried out by PCMCIA socket services 507 is well known to those of ordinary skill in the art.

Also illustrated in FIG. 5 is card memory area 303 as described above in connection with FIG. 3. Card memory area 303 comprises device driver information block (DDIB) header 305, device driver stub code image 307, and full device driver code 309.

Upon a card insertion event, PCMCIA socket services 507 receives an interrupt and initially responds to the card event. PCMCIA socket services 507 activates device driver loader 503 as indicated by line 603 in FIG. 5. Upon activation of device driver loader 503, PCMCIA socket services 507 provides device driver loader 503 with an identification of the socket adapter and socket for which the card event interrupt was received. Device driver loader 503 then accesses the device driver information block (DDIB) header 305 on the newly inserted card as indicated by line 605. By accessing DDIB header 305, device driver loader 503 gains access to the card information described above in connection with FIG. 4. Specifically, device driver loader 503 reads the device driver stub unique identification 407, device driver stub code offset 421, device driver stub code length 423, device driver stub data offset 425, and device driver stub data length 427. Using this information, device driver loader 503 determines where in card memory area 303 the device driver stub code image 307 resides. Once the location and size of device driver stub code image 307 is determined as indicated by line 607, device driver loader 503 copies the contents of device driver stub code image 307 from card memory area 303 into a portion of device driver stub RAM area 505 as indicated by line 609 in FIG. 5. The device driver stub code image 307 is written into device driver stub RAM area 505 set aside for the socket into which the card was inserted and linked into a linked list of device driver stubs maintained by device driver loader 503. The manner in which the device driver stubs are linked by device driver loader 503 is described in connection with FIGS. 6a and 6b.

Figure 6A:
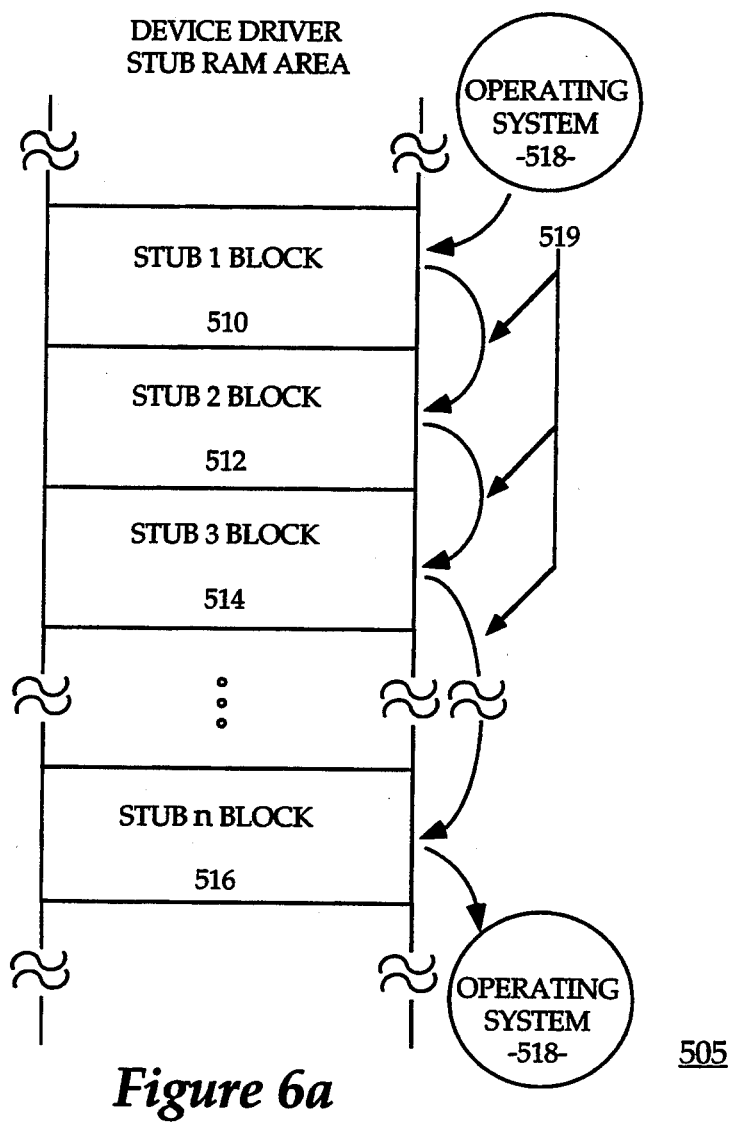
FIG. 6a illustrates the content of the Device Driver Stub RAM Area.

Referring now to FIG. 6a, the device driver stub RAM area 505 is illustrated. Device driver stub RAM area 505 comprises memory storage area for a plurality of device driver stub blocks. Each device driver stub block is equal in size to the maximum size permitted for the device driver stub of an individual card. There are as many device driver stub blocks as there are card sockets.

By way of example, FIG. 6a illustrates the general case where there are n card sockets in a system. In this case device driver RAM area 505 comprises stub 1 block 510, stub 2 block 512, stub 3 block 514, and stub n block 516. It will be apparent to those skilled in the art that any number n of device driver stub blocks may reside within device driver stub RAM area 505 dependent only upon the number of sockets, stub block size and amount of system memory available for allocation to device drivers. It will be also apparent to those skilled in the art that the number of stub blocks within device driver stub RAM area 505 that contain device driver stubs dynamically changes throughout the usage of the computer system as cards are added and removed. Thus, the device driver stubs do not need to be fixed in memory at bootstrap initialization time. It should also be noted that the relative size or number of memory locations required by each device driver stub block is relatively small in comparison to the full device driver code which controls feature card functionality. The relatively small size of each device driver stub block provides the opportunity to store a large number of different device driver stubs within device driver stub RAM area 505.

Figure 6B:
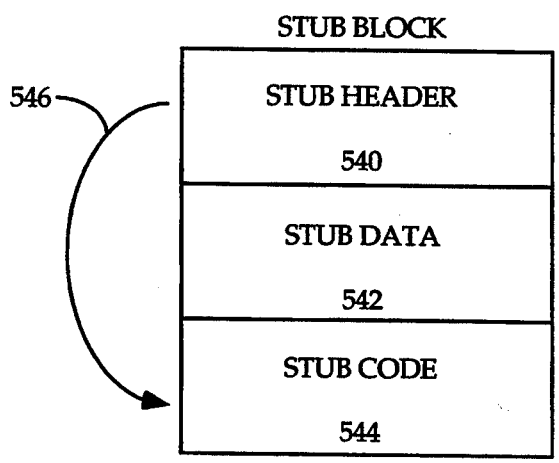
FIG. 6b illustrates the content of a stub block.

The device driver stub blocks within device driver stub RAM area 505 are each composed of three components. Referring now to FIG. 6b, the three components of each stub block of device driver stub RAM area 505 is illustrated. Each stub block comprises a stub header 540, stub data 542, and stub code 544. Stub header 540 is used mainly by operating system logic that controls the operation of the computer system.

Referring now to FIG. 6c, the content of stub header 540 is illustrated. Stub header 540 comprises device driver linkage information 630, device driver attribute information 632, device driver strategy offset 634, device driver interrupt offset 636, and device driver units and name 638. The computer system memory 102 resident device driver information 630, 632, 634, 636, and 638 of the stub header 540 corresponds to the device driver information 411, 413, 415, 417, and 419 of the card resident DDIB header. The DDIB device driver information is transferred to the stub header 540 when a stub device driver is loaded.

Device driver linkage information 630, device driver attribute information 632, and device driver units and name 638 comprise device driver identification and linking information used by the operating system to identify and link with the corresponding device driver. Device driver linkage information 630 is used by the operating system to create a forward linked list of device drivers as illustrated by lines 519 in FIG. 6a. Using the device driver linkage information 630, the operating system 518 may access each device driver in the linked list by traversing down the list using the device driver linkage information of each device driver stub block until the last device driver stub block points back to the operating system 518. Stub header 540 also includes a device driver strategy offset 634 and a device driver interrupt offset 636 which are used to identify the entry point to stub code 544 as illustrated by line 546 in FIG. 6b.

Referring now to FIG. 6d, the content of stub data 542 is illustrated. Stub data 542 comprises adapter identification field 664 and a socket identification field 666. Adapter identification 664 and socket identification 666 uniquely identify the computer system hardware interface with which the device driver stub is associated. Device driver stub unique identification 668, which is the same identification as the feature card resident device driver stub unique identification 407 illustrated in FIG. 4, uniquely identifies the device driver stub associated with the feature card. Card insertion flag 672 is used to retain an indication of whether the card associated with the device driver stub is inserted or removed. Driver specific data area 674 is a memory area allocated for use by the device driver stub for storage of its own data.

Referring now to FIGS. 7-13, flowcharts illustrating the processing logic used by one embodiment are illustrated. It will be apparent to those skilled in the art that the processing logic described herein may be executed by processor 101 of the computer system.

Figure 7:
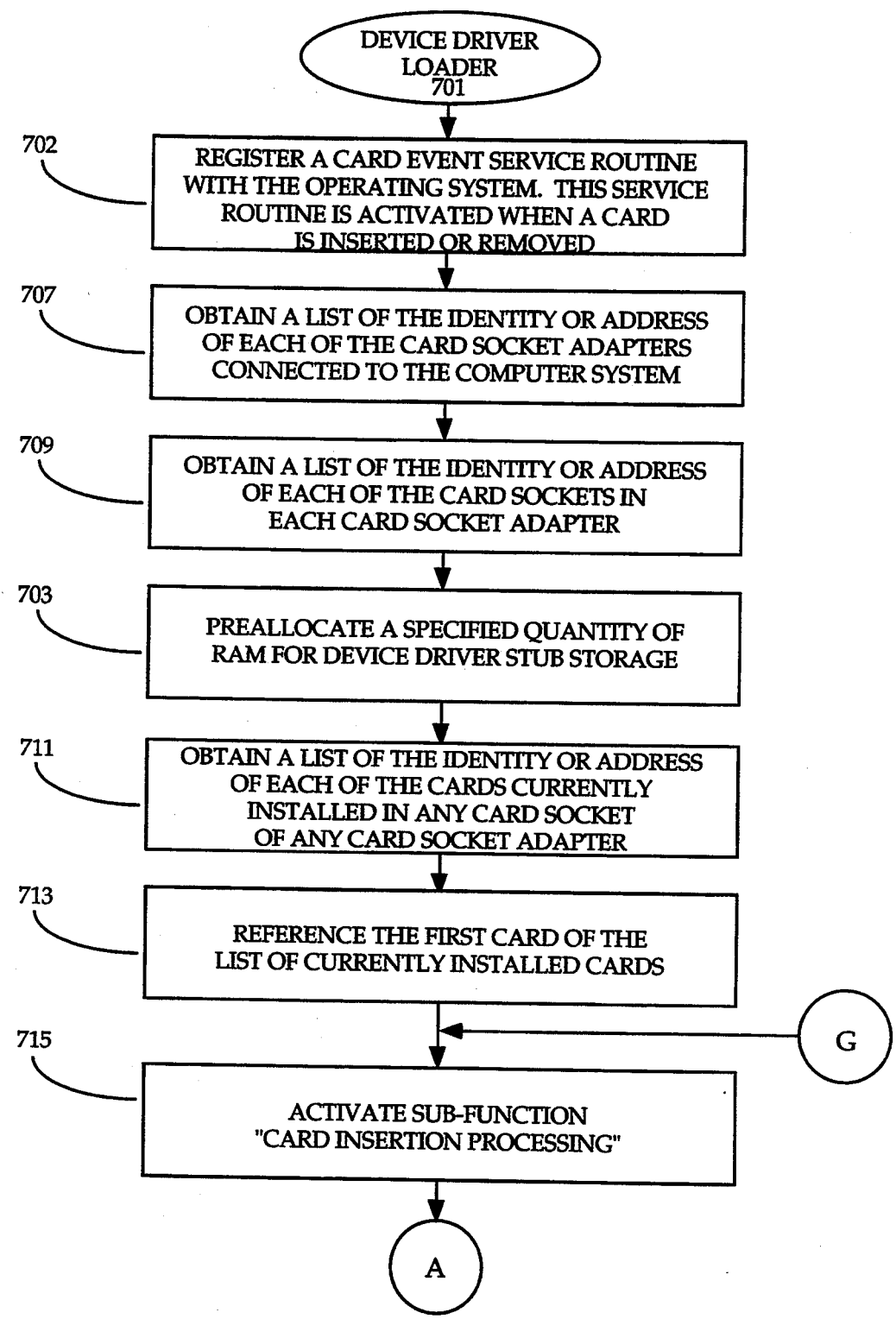
FIGS. 7–13 are flow charts illustrating the processing logic of one embodiment of the present invention.

Referring now to FIG. 7, the processing logic associated with the device driver loader 701 is illustrated. Device driver loader logic 701 corresponds to device driver loader 503 illustrated in FIGS. 5 and 6a. Processing logic starting at bubble 701 may be activated by the operating system at bootstrap initialization of the computer system. In one embodiment of the present invention, parameters of the device driver loader would include the number of sockets in the system and the size of a device driver stub block to be allocated for each socket.

Upon activation of the device driver loader, a card event service routine is registered with the operating system in processing block 702. Means for registering a service routine with the operating system is well-known in the art. This card event service routine is activated upon a card insertion or removal event.

Next, in processing block 707, the hardware interfaces are queried to determine the identity and address of card socket adapters that are connected and available for use within the computer system. The address or identity of each of the card sockets within each card socket adapter is determined in processing block 709. In an alternate embodiment, the number and size of device driver stub blocks to set aside can be determined from the number of sockets identified in processing block 707. This would be the case if the maximum device driver stub block size is constant, and known. In this case, there would be no need to specify these values as parameters of the device driver loader. In another alternative embodiment, a predetermined list of card socket adapters may be provided, for example as parameters to the device driver loader.

Device driver stub RAM area 505 is allocated in processing block 703. A quantity of random access memory 102 is allocated for the storage of device driver stubs in device driver stub RAM area 505.

If any feature cards are currently installed in any of the available sockets of the computer system, the identity or address of the installed cards is obtained in processing block 711. The device driver loader now has a list of card socket adapters, a list of card sockets, and a list of currently installed feature cards. An index parameter is initialized to point to the first of the currently installed cards in the list of installed cards in processing block 713. A sub function called "Card Insertion Processing" is then activated in processing block 715 to install the device driver stub for the currently indexed card. Device driver loader processing continues at the bubble labeled A as illustrated in FIG. 8.

Figure 8:
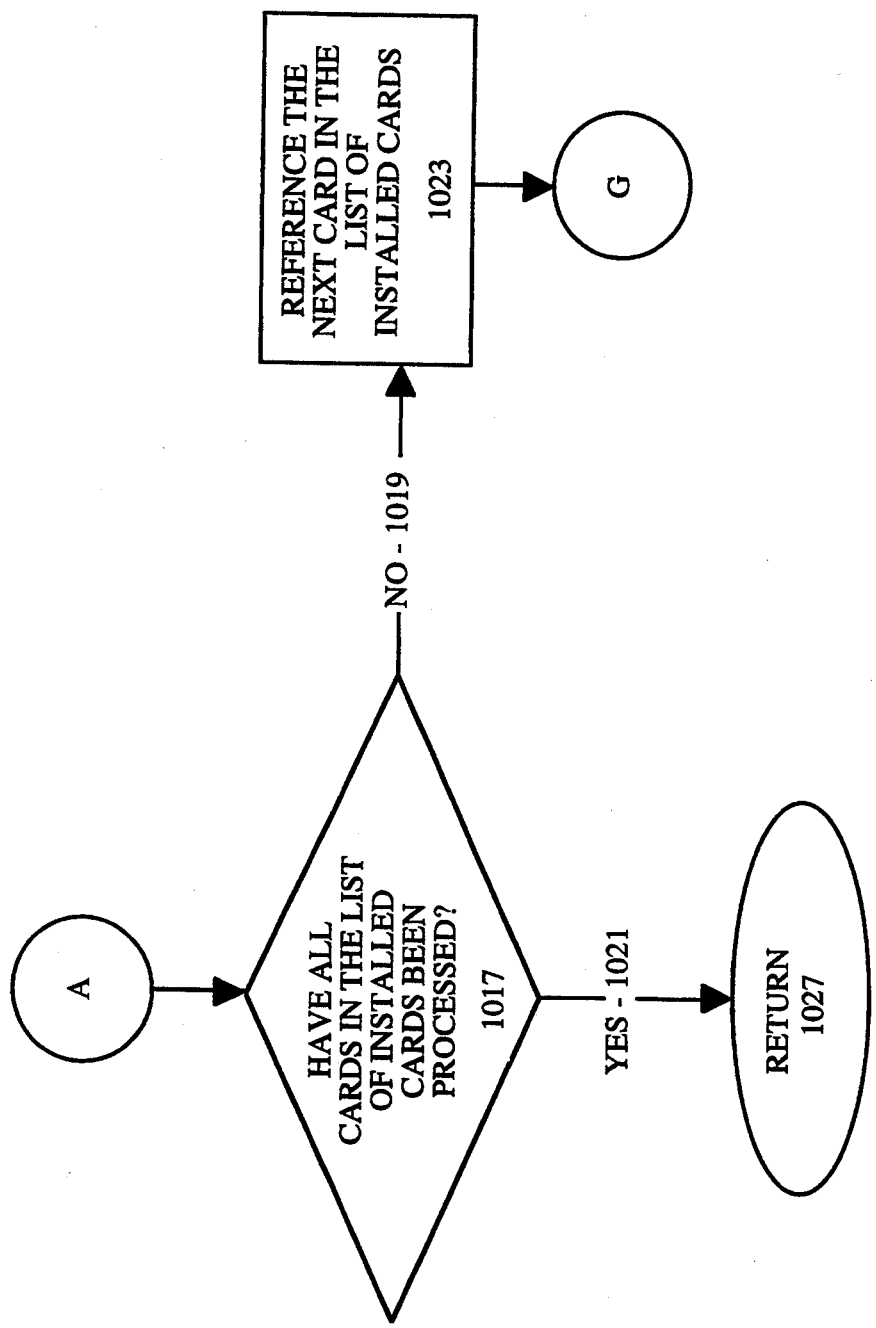

Referring now to FIG. 8, the processing for the device driver loader continues at the bubble labeled A. As the list of currently installed cards is processed, decision block 1017 is executed to determine if all cards have been processed. Once all of the cards in the list of installed cards have been processed, processing path 1021 is taken to termination bubble 1027 where processing for the device driver loader terminates. If each of the installed cards in the list of installed cards have not yet been processed, processing path 1019 is taken to processing block 1023 where the index into the list of installed cards is advanced to point to the next installed card and processing continues at the bubble labeled G as illustrated in FIG. 7. At the bubble labeled G, the card insertion processing sub function is again activated for the newly indexed installed card.

Figure 9:
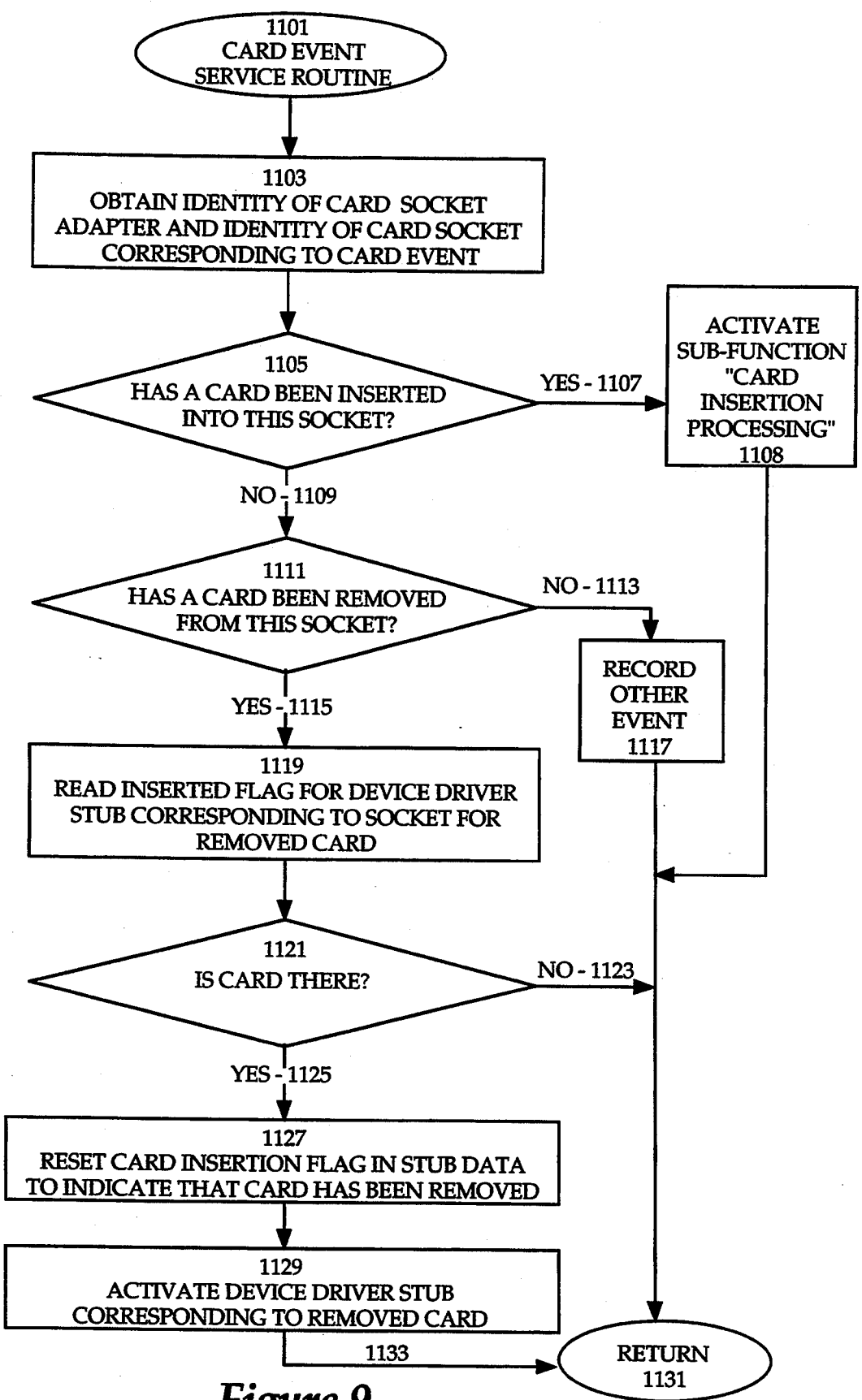

Referring now to FIG. 9, the processing for a card event service routine 1101 is illustrated. Card event service routine 1101 is a software routine registered with the operating system at bootstrap initialization of the computer system. Card event service routine 1101 is activated when a hardware event is detected by the computer system upon the insertion or removal of a feature card in any socket provided by the computer system. Upon activation of card event service routine 1101, the identity of the card socket adapter and the card socket corresponding to the hardware event is obtained in processing block 1103. If a card insertion event is detected, processing path 1107 is taken to processing block 1108 where the card insertion processing sub function is activated for the newly installed card. Processing then terminates at return bubble 1131.

Referring again to decision block 1105, if a card has not been inserted into a socket, processing path 1109 is taken to decision block 1111. If a card removal event is detected, processing path 1115 is taken to processing block 1119 where the inverted flag is read for the device driver stub corresponding to the socket for the removed card. If the device driver stub corresponding to the removed card indicates, processing path 1125 is taken to processing block 1127 where a card insertion flag in the stub data is reset to indicate that the corresponding card has been removed. Once the card insertion flag for the removed card has been reset, the device driver stub corresponding to the removed card is activated in processing block 1129. Activation of the device driver stub corresponding to the removed card causes the device driver stub to gracefully terminate any ongoing activity while the card was installed and disables further access to the removed card. Upon completion of processing block 1129, processing path 1133 is taken to bubble 1131 where processing for card event servicing terminates.

Referring back to decision block 1111, if the hardware event causing the activation of card event service routine 1101, is neither a card insertion event nor a card removal event, processing path 1113 is taken to processing block 1117 where the unidentified event is recorded. Processing then terminates at bubble 1131.

Figure 10:
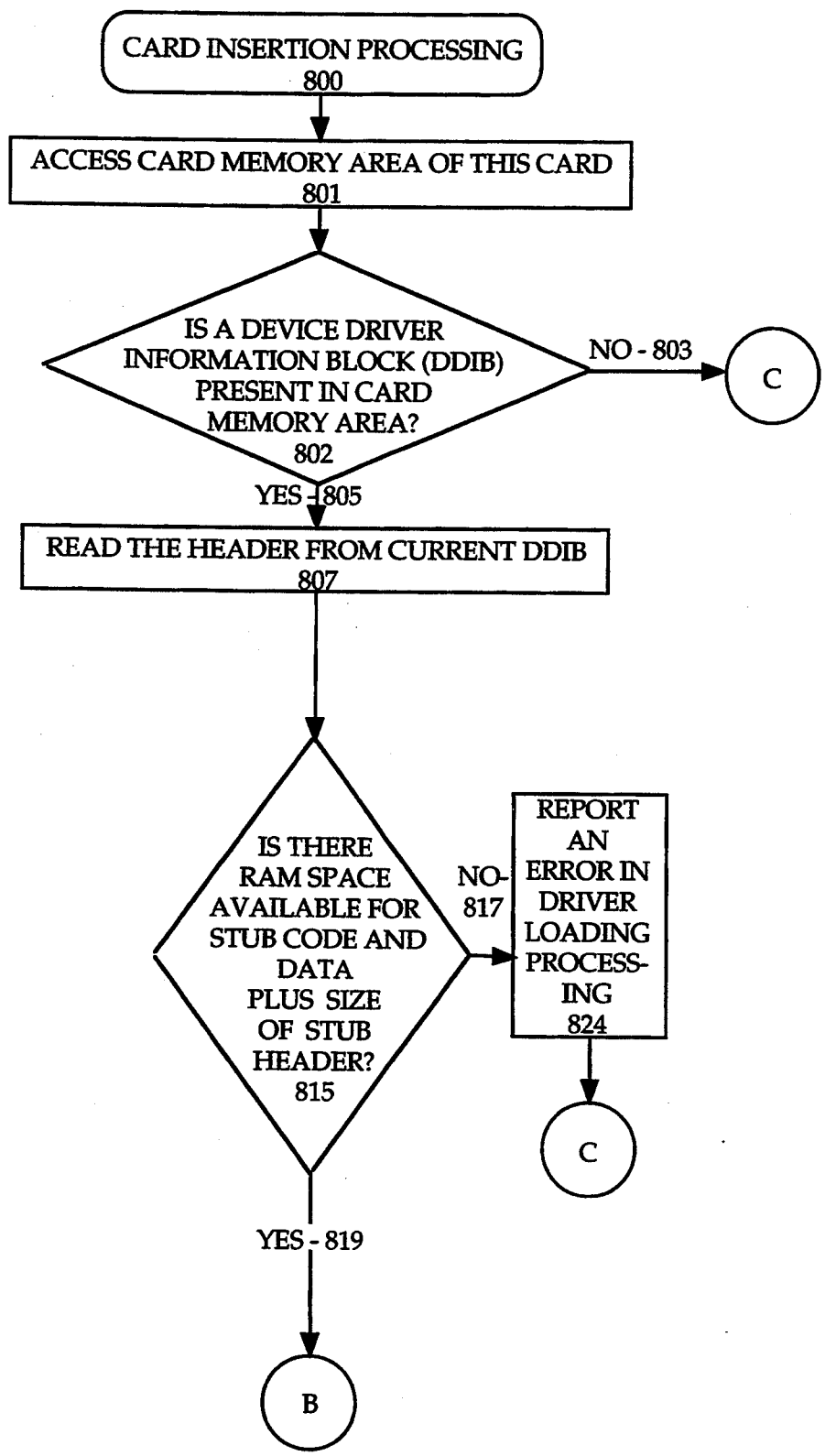

Referring now to FIG. 10, the card insertion processing sub function 800 is illustrated. Card insertion processing 800 is activated either from processing block 715 illustrated in FIG. 7 or processing block 1108 illustrated in FIG. 9. Card insertion processing 800 is responsible for controlling the allocation and loading of a device driver stub corresponding to a newly inserted feature card. Starting at processing block 801, the card memory area of the newly inserted card is accessed. If a device driver information block (DDIB) is present in the card memory area of the newly installed card, processing path 805 is taken to processing block 807. At block 807 the header of the DDIB of the newly installed card is read. If no DDIB is present in the card memory area, processing path 803 is taken to the bubble labeled C illustrated in FIG. 12 where card insertion processing terminates at bubble 1017. Because not all feature cards require a device driver, processing path 803 is provided for those cards that do not require a device driver.

Figure 11:
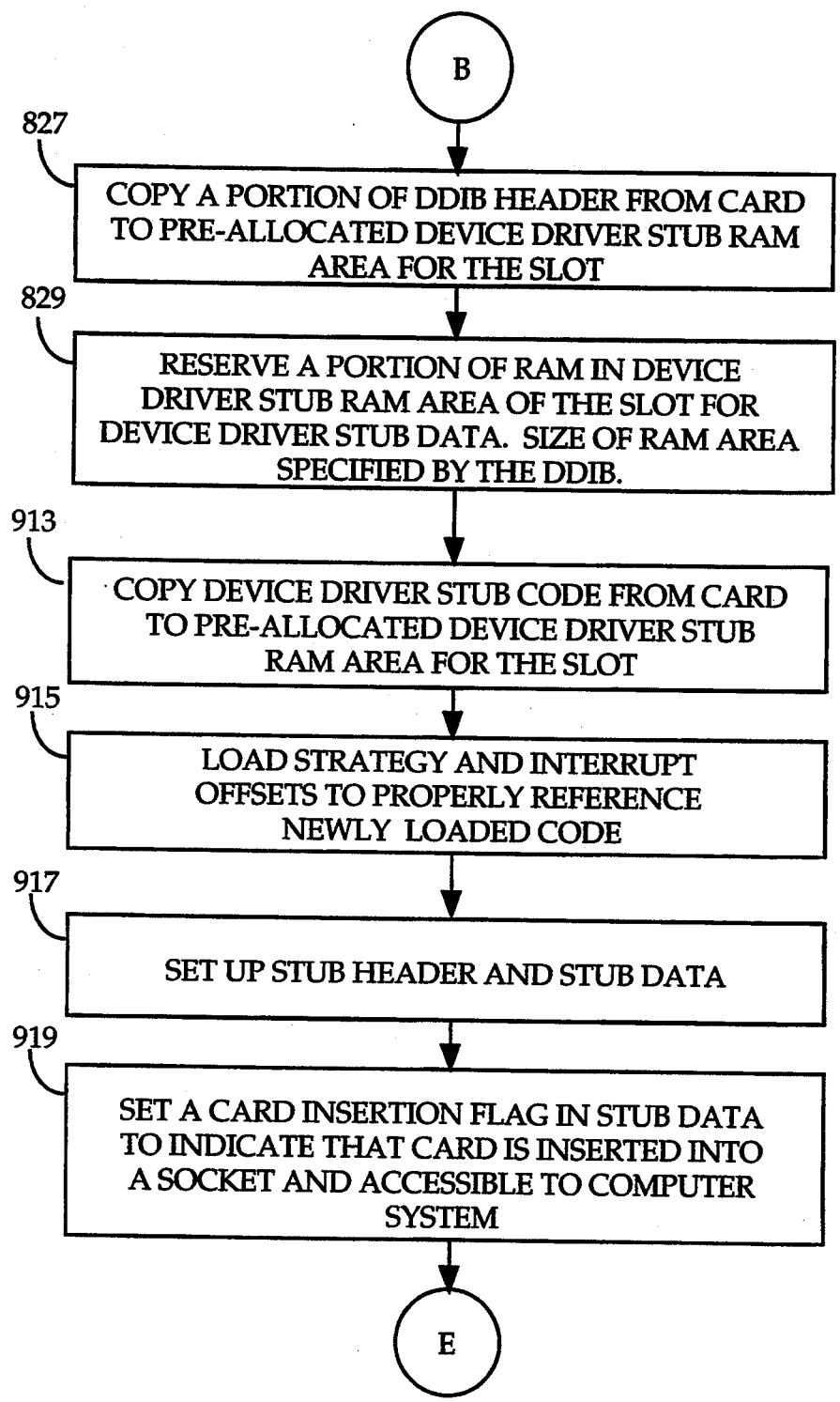
Figure 12:
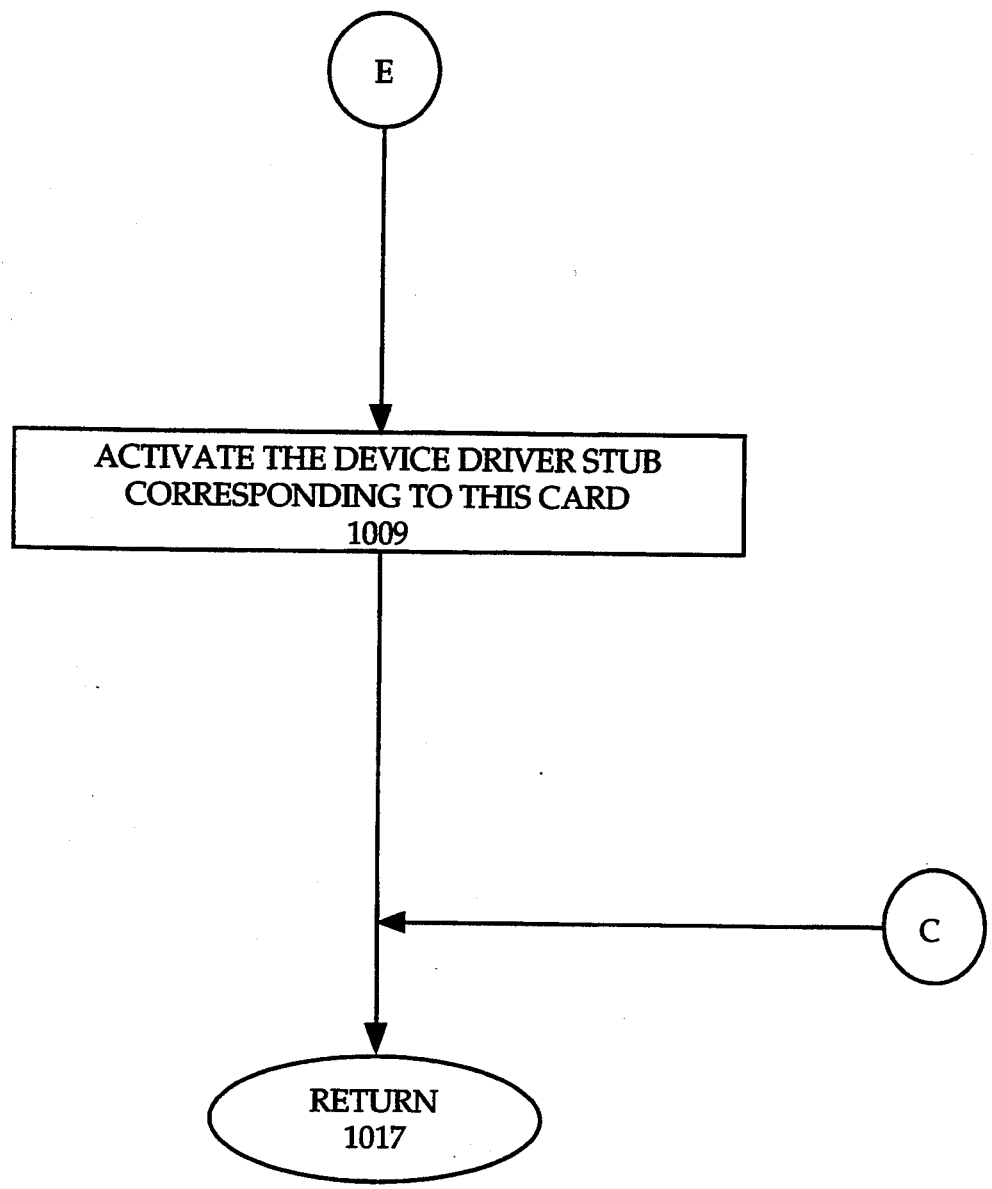

In decision block 815 a test is made to determine if there is enough space in device driver stub RAM area 505 for the storage of the device driver stub executable code, the device driver stub data, and the stub header. If the card complies with the maximum device driver stub block constraint, there will be enough RAM space available and processing path 819 is taken to the bubble labeled B as illustrated in FIG. 11. If, however, as a result of the test made in decision block 815, it is determined that there is not enough RAM space available, processing path 817 is taken to processing block 824 where an error in device driver loading processing is reported and processing terminates through the bubble labeled C as illustrated in FIG. 12.

Referring now to FIG. 11, card insertion processing continues at the bubble labeled B. At this point, it has been determined that sufficient space is available in device driver stub RAM area 505 for the storage of the device driver stub for the newly inserted feature card. In processing block 827, a portion of the DDIB header from the newly installed card is copied into the device driver stub block corresponding to the socket containing the card. In particular, fields 411, 413, 415, 417, and 419 of the DDIB header are copied into fields 630, 632, 634, 636, and 638 of the stub header, respectively. An additional portion of RAM in the device driver stub block RAM area is reserved for device driver stub data in processing block 829. The size of this stub data area is specified by a parameter 427 in the DDIB header.

In processing block 913, the device driver stub executable code is copied from the newly installed feature card to the preallocated device driver stub block RAM area within device driver stub RAM area 505. The strategy and interrupt offsets are loaded in processing block 915 to properly reference the newly loaded code. Processing then continues at processing block 917.

At processing block 917, the stub header area and stub data area within device driver stub RAM area 505 is initialized. Initialization of these areas includes loading linkage pointers, adapter and socket identification information, and the device driver unique stub identification. These areas may be loaded by transferring the corresponding information from the card resident DDIB header. A card insertion flag in the stub data is set in processing block 919 to indicate that the card is inserted into a socket and accessible to the computer system. Processing then continues at the bubble labeled E as illustrated in FIG. 12.

Referring now to FIG. 12, the device driver stub corresponding to the newly inserted card is activated in processing block 1009. As a result of the activation of the device driver stub, the device driver stub enables the activation of the full device driver code 309 resident on the newly installed card. Activation of the full card resident device driver code 309 is enabled and memory mapping to the newly installed card is allowed. Thus, the device driver stub provides a linkage between the computer system software and the card resident functionality. Card insertion processing terminates at termination bubble 1017.

Figure 13:
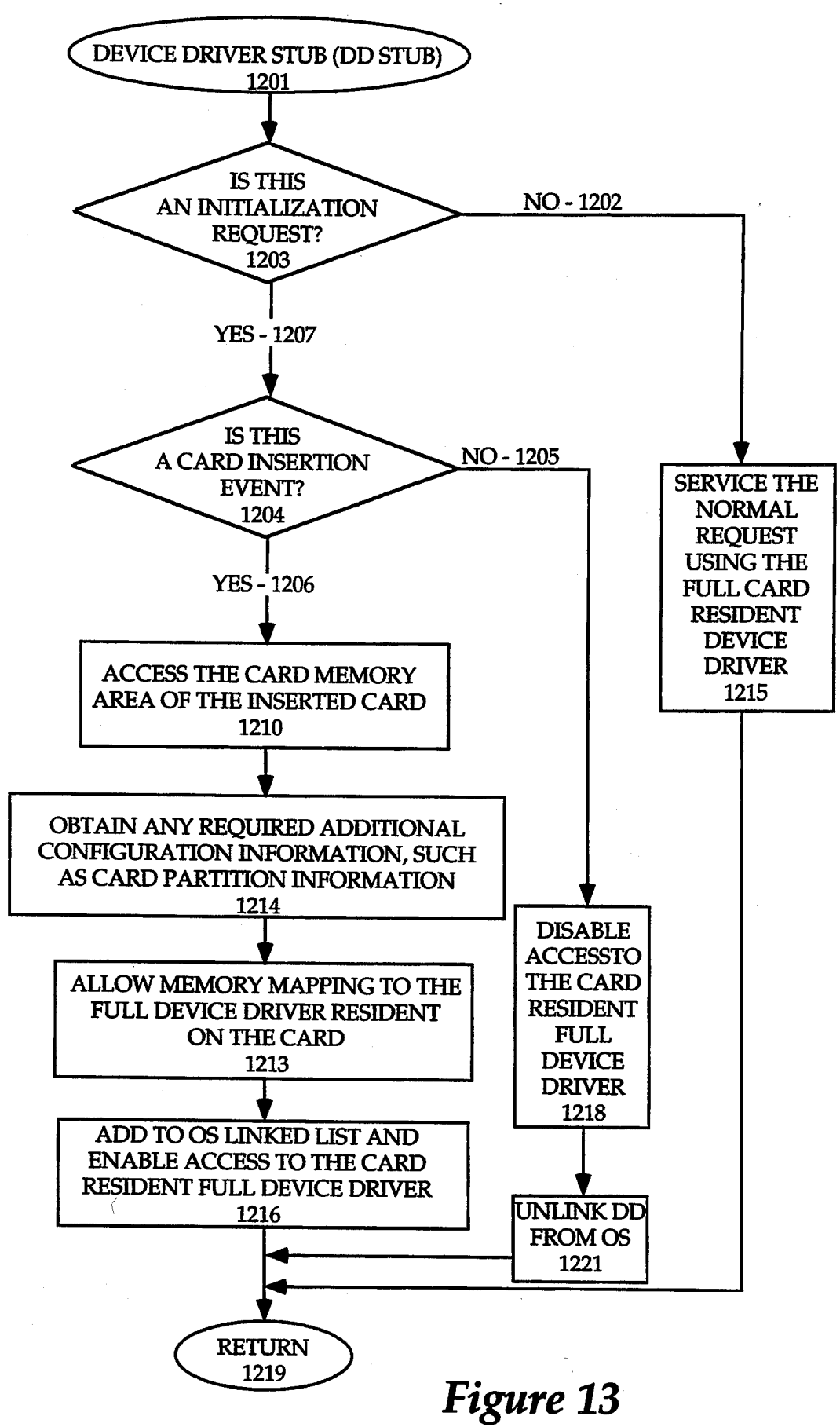

Referring now to FIG. 13, the processing logic for each device driver stub is illustrated starting at bubble 1201. The device driver stub processing logic is activated in response to a card insertion or removal event. For example, device driver stub processing logic is executed in response to the activation of the device driver stub logic in processing block 1129 illustrated in FIG. 9 and in processing block 1009 illustrated in FIG. 12.

If the device driver stub is being activated in order to initialize the operation of the device driver stub after being loaded, processing path 1207 is taken to decision block 1204. If the activation of the device driver stub is the result of a card insertion event, processing path 1206 is taken to processing block 1210 where the card memory area of the inserted card is accessed. Any necessary configuration or card partition information is obtained by the device driver stub in processing block 1214. Mapping to the full device driver resident on the feature card is enabled in processing block 1213. In processing block 1216, the newly installed device driver stub is added to the linked list of device drivers 519 (in FIG. 6a) maintained by the operating system. This is done in an operating system specific way. Then, access to the card resident full device driver is enabled in processing block 1216 before the device driver stub processing logic terminates in terminal bubble 1219. As a result of enabling access to the card resident full device driver, processing control may subsequently be transferred to the full card resident device driver where feature card functionality may be fully exploited. By executing the card resident full device driver, the full device driver executable code does not need to be transferred to computer system random access memory for execution therein.

Referring again to decision block 1204, if the device driver stub is not activated in response to a card insertion event, a card removal event is assumed. In this case, processing path 1205 is taken to processing block 1218 where access to the card resident full device driver is disabled in response to the removal of the card. Then, in processing block 1221, the device driver is unlinked from the operating system in an operating system dependent manner. In this way, computer system software is prevented from inadvertently attempting to access a removed card.

Referring back to decision block 1203, if the device driver stub is not activated for the purpose of initializing the device driver stub, processing path 1202 is taken to processing block 1215. Processing path 1202 is taken during the normal operation of the device driver stub after initialization has occurred. If the card corresponding to the device driver stub is still present and active, a normal device driver request is serviced by the full card resident device driver. However, if the card has been removed, the operating system will trap the error and notify the device requesting access to the card that the access cannot be completed. Upon completion of the request in processing block 1215, processing terminates at bubble 1219.

The operation of the present invention is best illustrated by example. FIGS. 14a–16f illustrate an embodiment of the present invention as it would operate through a series of card insertions and removals. In each of the examples, a device driver loader within a computer system which has two card slots (sockets) responds as the size of device driver stubs is varied from example to example. It will be obvious to one of ordinary skill in the art that the following examples are provided for didactic purposes and are therefore not intended to exhaust the myriad number of possible embodiments of the present invention.

Referring now to the example of FIGS. 14a–e, FIG. 14a depicts a section of computer system memory 1400 which has been set aside by the device driver loader to store device driver stubs. Because the computer system has two slots, memory area 1400 has been divided into two equal sized areas 1402 and 1404 (one area per slot). Area 1402 corresponds to slot 1 and extends from memory address A0 to memory address A1. Area 1404 corresponds to slot 2 and extends from memory address A1 to memory address A2. It will be obvious to one of ordinary skill in the art that for this example the actual size of areas 1402 and 1404 is not important so long as areas 1402 and 1404 are of equal size and the size has been selected to be at least as large as the largest device driver stub corresponding to a card which will occupy either of the slots.

Figure 14A:
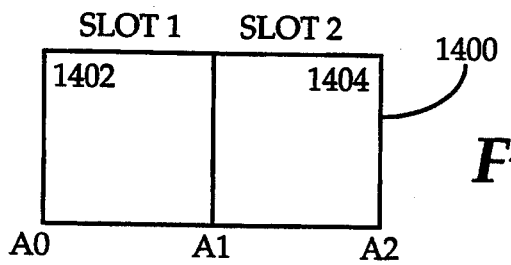
FIGS. 14a–e illustrate the operation of the present invention in an example involving equal sized device driver stubs.
Figure 14B:
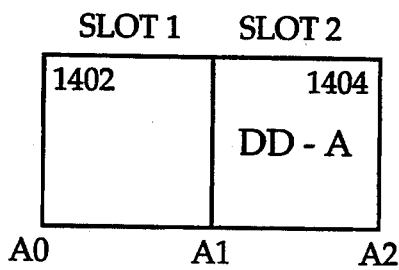

Referring now to FIG. 14b, the section of computer system memory is illustrated as it would appear after a card A having a device driver stub DD-A was inserted into slot 2. Memory area 1404 has been set aside by the device driver loader to contain the device driver stub of a card occupying slot 2. Therefore, because card A was inserted into slot 2, device driver stub DD-A will be loaded by the device driver loader into area 1404.

If card A were later removed from slot 2, the device driver loader would update the card inserted flag to indicate that card A has been removed from slot 2 and then execute the device driver stub DD-A. Reinsertion of card A into slot 2 would cause the device driver loader to repeat the above process as though card A had been inserted into slot 2 for the first time.

Figure 14C:
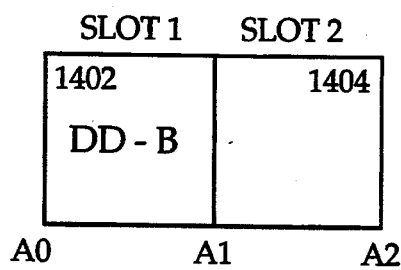

Referring now to FIG. 14c, the section of computer system memory is illustrated as it would appear after a card B having a device driver stub DD-B was inserted into slot 1. Memory area 1402 has been set aside by the device driver loader to contain the device driver stub of a card occupying slot 1. Therefore, because card B was inserted into slot 1, device driver stub DD-B will be loaded by the device driver loader into area 1402.

Figure 14D:
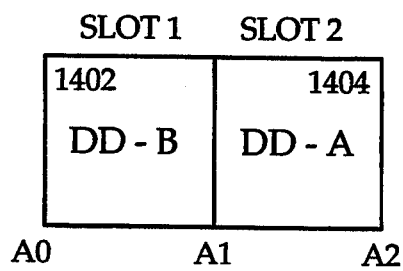

Referring now to FIG. 14d, the section of computer system memory is illustrated as it would appear after card B having device driver stub DD-B was inserted into slot 1 while card A having a device driver stub DD-A was in slot 2. Memory areas 1402 and 1404 have been set aside by the device driver loader to contain the device driver stub of a card occupying slots 1 and 2, respectively. Therefore, because card B was inserted into slot 1 and card A was inserted into slot 2, device driver stub DD-B will be loaded by the device driver loader into area 1402 and device driver stub DD-A will be loaded by the device driver loader into area 1404.

Figure 14E:
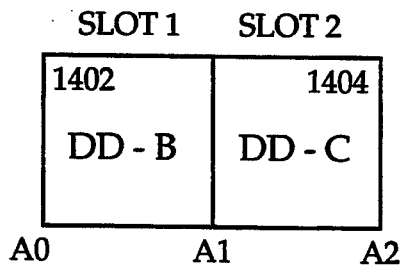

Referring now to FIG. 14e, the section of computer system memory is illustrated as it would appear after a card B having a device driver stub DD-B was inserted into slot 1 while card C having a device driver stub DD-C was in slot 2. Memory areas 1402 and 1404 have been set aside by the device driver loader to contain the device driver stub of a card occupying slots 1 and 2, respectively. Therefore, because card B was inserted into slot 1 and card C was inserted into slot 2, device driver stub DD-B will be loaded by the device driver loader into area 1402 and device driver stub DD-C will be loaded by the device driver loader into area 1404.

Note that in FIG. 14e, if card A had occupied slot 2 before card C as illustrated in FIG. 14d, device driver stub DD-A would have previously been resident in area 1404 and the device driver loader would have then loaded device driver stub DD-C into area 1404 thereby replacing DD-A with DD-C in area 1404.

Also note that if a user were to insert a card having a device driver stub greater in size than areas 1402 or 1404, the device driver stub would not be loaded by the device driver loader and an error message would result. This is the case even if memory areas 1402 and 1404 combined could contain the device driver stub for the card.

Referring now to the example of FIGS. 15a–g, FIG. 15a depicts a section of computer system memory 1500 which has been set aside by the device driver loader to store device driver stubs. Because the computer system has two slots, memory area 1500 has been divided into two equal sized areas 1502 and 1504 (one area per slot). In this example, various combinations of four cards (denoted cards A-D) will be inserted into the two slots. The device driver stubs of cards C and D are equal in size. The device driver stubs of cards A and B are also equal in size, but they are smaller than the device driver stubs of cards C and D. Area 1502 corresponds to slot 1 and extends from memory address A0 to memory address A2. Area 1504 corresponds to slot 2 and extends from memory address A2 to memory address A4. The device driver stubs of cards C and D are each equal in size to area 1502 or 1504.

It will be obvious to one of ordinary skill in the art that for this example the actual size of areas 1502 and 1504 is not important so long as areas 1502 and 1504 are of equal size and the size has been selected to be at least as large as the largest device driver stub corresponding to a card which will occupy either of the slots.

Figure 15A:
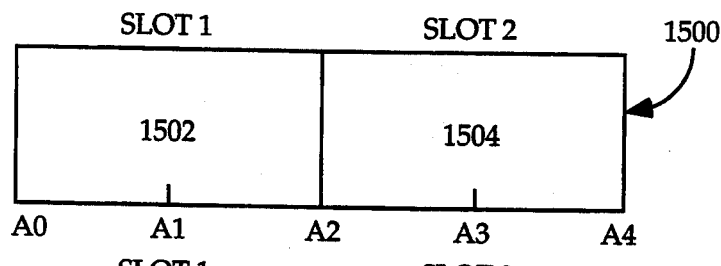
FIGS. 15a–g illustrate the operation of the present invention in an example involving different sized device driver stubs.
Figure 15B:
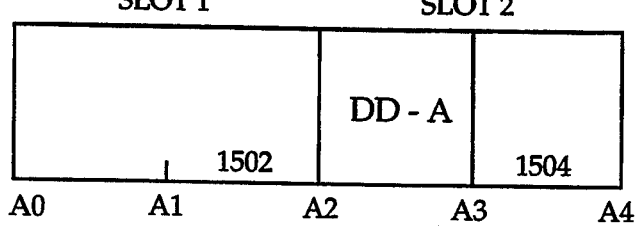

Referring now to FIG. 15b, the section of computer system memory is illustrated as it would appear after card A having device driver stub DD-A had been inserted into slot 2. Memory area 1504 has been set aside by the device driver loader to contain the device driver stub of a card occupying slot 2. Therefore, because card A was inserted into slot 2, device driver stub DD-A will be loaded by the device driver loader into area 1504.

However, because DD-A is smaller than area 1504, DD-A will be loaded into a sub-area of area 1504. This sub-area of area 1504 extends from address A2 to A3. Note that the sub-area of area 1504 extending from address A3 to A4 will remain empty.

As in the previous example, if card A were later removed from slot 2, the device driver loader would update the card inserted flag to indicate that card A has been removed from slot 2 and then execute the device driver stub DD-A. Subsequent reinsertion of card A into slot 2 would cause the device driver loader to repeat the above process as though card A had been inserted into slot 2 for the first time.

Figure 15C:
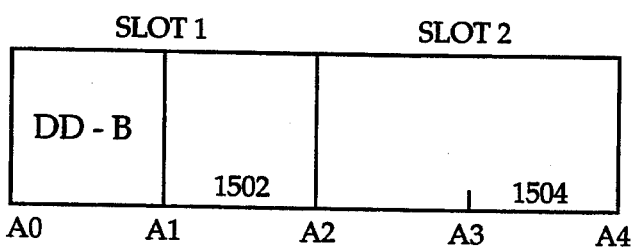

Referring now to FIG. 15c, the section of computer system memory is illustrated as it would appear after card B having device driver stub DD-B was inserted into slot 1. Memory area 1502 has been set aside by the device driver loader to contain the device driver stub of a card occupying slot 1. Therefore, because card B was inserted into slot 1, device driver stub DD-B will be loaded by the device driver loader into area 1502. Once again, however, because DD-B is smaller than area 1502, DD-B will be loaded into a sub-area of area 1502. This sub-area of area 1502 extends from address A0 to A1. Note that the sub-area of area 1502 extending from address A1 to A2 will remain empty.

Figure 15D:
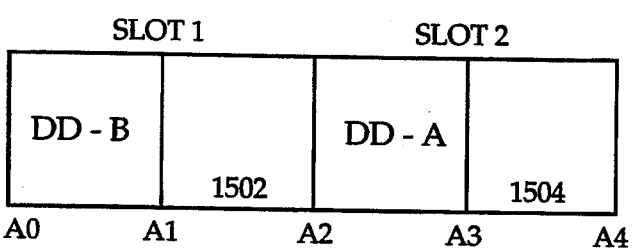

Referring now to FIG. 15d, the section of computer system memory is illustrated as it would appear after card B having a device driver stub DD-B was inserted into slot 1 while card A having device driver stub DD-A was in slot 2. Memory areas 1502 and 1504 have been set aside by the device driver loader to contain the device driver stub of a card occupying slots 1 and 2, respectively. Therefore, because card B was inserted into slot 1 and card A was inserted into slot 2, device driver stub DD-B will be loaded by the device driver loader into area 1502 and device driver stub DD-A will be loaded by the device driver loader into area 1504.

Figure 15E:
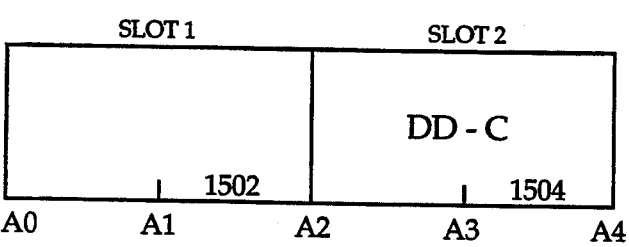

Referring now to FIG. 15e, the section of computer system memory is illustrated as it would appear after card C having device driver stub DD-C had been inserted into slot 2. Memory area 1504 has been set aside by the device driver loader to contain the device driver stub of a card occupying slot 2. Therefore, because card C was inserted into slot 2, device driver stub DD-C will be loaded by the device driver loader into area 1504. Note that because DD-C is equal in size to area 1504, DD-C will be loaded into, and occupy all of, area 1504.

Figure 15F:
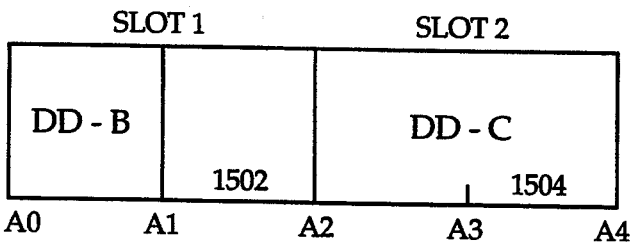

Referring now to FIG. 15f, the section of computer system memory is illustrated as it would appear after card B having a device driver stub DD-B was inserted into slot 1 while card C having device driver stub DD-C was in slot 2. Memory areas 1502 and 1504 have been set aside by the device driver loader to contain the device driver stubs of cards occupying slots 1 and 2, respectively. Therefore, because card B was inserted into slot 1 and card C was inserted into slot 2, device driver stub DD-B will be loaded by the device driver loader into area 1502 and device driver stub DD-C will be loaded by the device driver loader into area 1504. DD-C is equal in size to area 1504, therefore DD-C will be loaded into, and occupy all of, area 1504. However, DD-A is smaller than area 1502, therefore DD-A will be loaded into a sub-area of area 1502. This sub-area of area 1502 extends from address A0 to A1. Note that the sub-area of area 1502 extending from address A1 to A2 will remain empty.

Note that in FIG. 15f, if card A had occupied slot 2 before card C as illustrated in FIG. 15d, the device driver loader would have then loaded device driver stub DD-C into area 1504 thereby replacing DD-A with DD-C in area 1504.

Figure 15G:
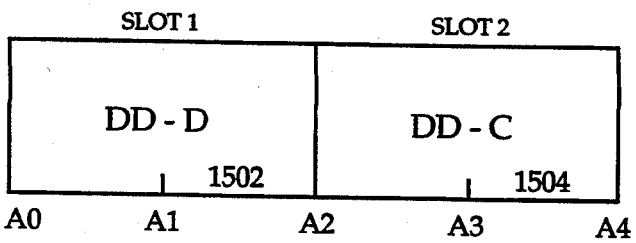

Referring now to FIG. 15g, the section of computer system memory is illustrated as it would appear after card D having a device driver stub DD-D was inserted into slot 1 while card C having device driver stub DD-C was in slot 2. Memory areas 1502 and 1504 have been set aside by the device driver loader to contain the device driver stub of a card occupying slots 1 and 2, respectively. Therefore, because card D was inserted into slot 1 and card C was inserted into slot 2, device driver stub DD-D will be loaded by the device driver loader into area 1502 and device driver stub DD-C will be loaded by the device driver loader into area 1504. Both DD-D and DD-C are equal in size to areas 1502 and 1504, therefore, DD-D will be loaded into, and occupy all of, area 1502 while DD-C will be loaded into, and occupy all of, area 1504.

Note that in FIG. 15g, if card A (or B) had occupied slot 2 before card C, the device driver loader would have loaded device driver stub DD-C into area 1504 thereby replacing DD-A (or DD-B) with DD-C in area 1504.

Similarly, if card A (or B) had occupied slot 1 before card D, the device driver loader would have loaded device driver stub DD-D into area 1502 thereby replacing DD-A (or DD-B) with DD-D in area 1502.

In the case where a computer system had more than one slot, but only used one card which had a large device driver stub and the rest of the cards each had small stubs, additional system memory would be saved by allocating a small area of system memory to every slot except one (which would have enough system memory allocated to it to hold the device driver stub of the card with the relatively large device driver stub).

Of course, while system memory would be saved, the card with the big device driver stub could only be inserted into the slot corresponding to the bigger system memory allocation. If the card with the big device driver stub were inserted into any other socket, the socket would not have enough system memory allocated to accommodate the device driver stub. In that case, the device driver loader would not load the big device driver stub. Instead, the device driver loader would issue an error message stating that the device driver stub could not be loaded. In one embodiment, the error message could suggest that the system memory allocation for the socket be increased and that the system then be reset by a bootstrap initialization operation. Alternately, the error message could simply suggest that the card be removed and inserted into the socket which already has a larger system memory allocation. In the latter case, since system memory would not have to be reallocated, the system would not have to be reset.

Referring now to the example of FIGS. 16a-f, FIG. 16a depicts a section of computer system memory 1600 which has been set aside by the device driver loader to store device driver stubs. Because the computer system has two slots, memory area 1600 has been divided into two areas 1602 and 1604 (one area per slot).

In this example, various combinations of three cards (denoted cards A-C) will be inserted into the two slots. The device driver stubs of cards A and B are equal in size. The device driver stub of card C is larger than the device driver stubs of cards A and B. Area 1602 corresponds to slot 1 and extends from memory address A0 to memory address A1. Area 1604 corresponds to slot 2 and extends from memory address A1 to memory address A3. The device driver stubs of cards A and B are equal in size to area 1502. The device driver stub of card C is equal in size to area 1504.

It will be obvious to one of ordinary skill in the art that for this example the actual size of areas 1602 and 1604 is not important so long as area 1602 is smaller than area 1604 and the size of the areas 1602 and 1604 has been selected to be at least as large as the largest device driver stub corresponding to a card which will occupy the respective corresponding slot.

Figure 16A:
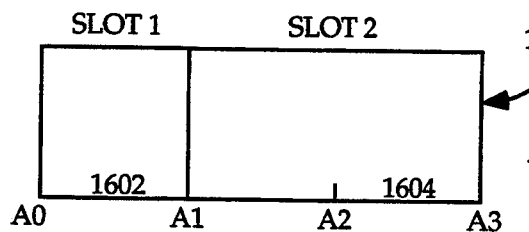
FIGS. 16a–f illustrate the operation of the present invention in an example involving different sized computer system memory allocations per slot.
Figure 16B:
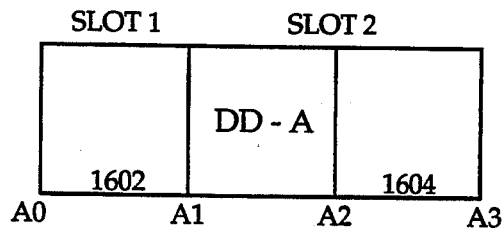

Referring now to FIG. 16b, the section of computer system memory is illustrated as it would appear after card A having device driver stub DD-A had been inserted into slot 2. Memory area 1604 has been set aside by the device driver loader to contain the device driver stub of a card occupying slot 2. Therefore, because card A was inserted into slot 2, device driver stub DD-A will be loaded by the device driver loader into area 1604. However, because DD-A is smaller than area 1604, DD-A will be loaded into a sub-area of area 1604. This sub-area of area 1604 extends from address A1 to A3. Note that the sub-area of area 1604 extending from address A2 to A3 will remain empty.

As in the previous examples, if card A were later removed from slot 2, the device driver loader would update the card inserted flag to indicate that card A has been removed from slot 2 and then execute the device driver stub DD-A. Subsequent reinsertion of card A into slot 2 would cause the device driver loader to repeat the above process as though card A had been inserted into slot 2 for the first time.

Figure 16C:
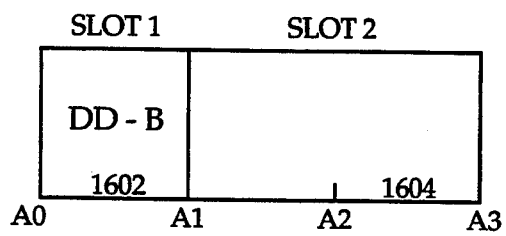

Referring now to FIG. 16c, the section of computer system memory is illustrated as it would appear after card B having device driver stub DD-B was inserted into slot 1. Memory area 1602 has been set aside by the device driver loader to contain the device driver stub of a card occupying slot 1. Therefore, because card B was inserted into slot 1, device driver stub DD-B will be loaded by the device driver loader into area 1602. Note that DD-B is the same size as area 1602 but smaller than area 1604. Also note that because DD-B is equal in size to area 1602, DD-B will be loaded into, and occupy all of, area 1602.

Figure 16D:
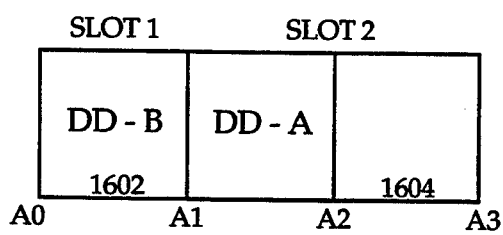

Referring now to FIG. 16d, the section of computer system memory is illustrated as it would appear after card B having a device driver stub DD-B was inserted into slot 1 while card A having device driver stub DD-A was in slot 2. Memory areas 1602 and 1604 have been set aside by the device driver loader to contain the device driver stub of a card occupying slots 1 and 2, respectively. Therefore, because card B was inserted into slot 1 and card A was inserted into slot 2, device driver stub DD-B will be loaded by the device driver loader into area 1602 and device driver stub DD-A will be loaded by the device driver loader into area 1604.

Figure 16E:
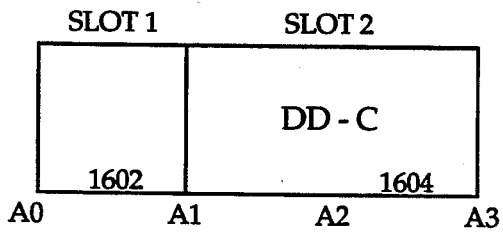

Referring now to FIG. 16e, the section of computer system memory is illustrated as it would appear after card C having device driver stub DD-C had been inserted into slot 2. Memory area 1604 has been set aside by the device driver loader to contain the device driver stub of a card occupying slot 2. Therefore, because card C was inserted into slot 2, device driver stub DD-C will be loaded by the device driver loader into area 1604. Note that because DD-C is equal in size to area 1604, DD-C will be loaded into, and occupy all of, area 1604.

Figure 16F:
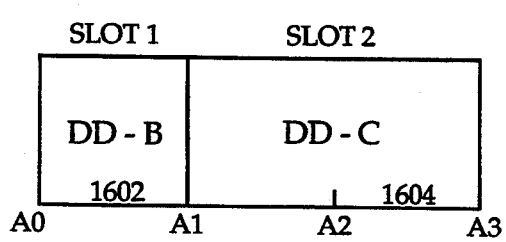

Referring now to FIG. 16f, the section of computer system memory is illustrated as it would appear after card B having a device driver stub DD-B was inserted into slot 1 while card C having device driver stub DD-C was in slot 2. Memory areas 1602 and 1604 have been set aside by the device driver loader to contain the device driver stubs of cards occupying slots 1 and 2, respectively. Therefore, because card B was inserted into slot 1 and card C was inserted into slot 2, device driver stub DD-B will be loaded by the device driver loader into area 1602 and device driver stub DD-C will be loaded by the device driver loader into area 1604. DD-C is equal in size to area 1604, therefore DD-C will be loaded into, and occupy all of, area 1604. DD-B is equal in size to area 1602, therefore DD-A will be loaded into, and occupy all of, area 1602.

Note that in FIG. 16f, if card A (or B) had occupied slot 2 before card C, the device driver loader would have loaded device driver stub DD-C into area 1604 thereby replacing DD-A (or DD-B) with DD-C in area 1604.

Similarly, if card B had occupied slot 1 before card A, the device driver loader would have loaded device driver stub DD-A into area 1602 thereby replacing DD-B with DD-A in area 1602.

Thus, a computer system having a method and apparatus for dynamically configuring device drivers of system resources is described.

While the method of the present invention has been described in terms of its presently preferred and alternate embodiments, those skilled in the art will recognize that the method of the present invention may be practiced with modification and alternation within the spirit and scope of the appended claims. The specifications and drawings are, accordingly, to be regarded in an illustrative rather than a restrictive sense.

I claim:

1. In a computer system having a processor, a system memory, and an interface for receiving a removable system resource, said interface including a plurality of sockets for receiving said removable system resource, a process for dynamically configuring device drivers of removable computer system resources, said process comprising the steps of:

allocating a portion of said system memory, said allocating step further including the step of allocating a plurality of sub-portions of said portion, said sub-portions equal in number to the number of sockets, such that each socket has a corresponding sub-portion;

providing a resource memory in a removable system resource;

loading a device driver into said resource memory, said device driver for controlling said removable system resource;

loading a device driver stub into said resource memory, said device driver stub for enabling said device driver;

receiving an indication that said removable system resource has been coupled to said interface subsequent to initialization of said processor, said receiving step further including the step of identifying a receiving socket of the plurality of sockets, said receiving socket coupling said removable system resource to said computer system;

copying said device driver stub into a sub-portion of said allocated portion of system memory corresponding to said receiving socket;

executing said device driver stub from said system memory;

enabling access to said device driver, said access being enabled by said device driver stub, said enabling step further including the step of allowing memory mapping to said device driver residing in said resource memory; and executing said device driver from said resource memory.

2. The process as set forth in claim 1 wherein said resource memory further includes a device driver information block (DDIB) header, said process further including the step of copying said DDIB header into said sub-portion corresponding to said receiving socket.

3. The process as claimed in claim 2 wherein said DDIB header includes link data and a device driver stub unique identification, said process further including the step of linking said device driver stub with a different device driver stub stored in system memory.

4. The process as claimed in claim 3 wherein said step of linking said device driver stub further includes the step of forward linking said device driver stub with a succeeding device driver stub and backward linking said device driver stub with a preceding device driver stub, said succeeding and preceding device driver stubs residing in system memory.

5. The process as set forth in claim 1 further including the steps of:

receiving an indication that a removable system resource has been decoupled from said interface; and disabling access to said device driver, said access being disabled by said device driver stub.

6. The process as claimed in claim 5 wherein said resource memory further includes a device driver information block (DDIB) header, said DDIB header including link data and a device driver stub unique identification, said process further including the steps of:

copying said DDIB header into said sub-portion corresponding to said receiving socket upon receiving said indication that said removable system resource has been coupled to said interface;

linking said device driver stub with a different device driver stub stored in system memory upon receiving said indication that said removable system resource has been coupled to said interface; and unlinking said device driver stub from said different device driver stub stored in system memory upon receiving said indication that said removable system resource has been decoupled from said interface.

7. In a computer system having a processor, a system memory, and an interface for receiving a removable system resource, said interface including a plurality of receiving means for receiving said removable system resource, a device for dynamically configuring device drivers of removable computer system resources, said device comprising:

a resource memory in said removable system resource, said resource memory comprising a device driver for controlling said removable system resource, said resource memory further including a device driver stub for enabling said device driver;

means for allocating a portion of said system memory, said means for allocating a portion of system memory further including means for allocating a plurality of sub-portions of said portion, said sub-portions equal in number to the number of receiving means, such that each receiving means has a corresponding sub-portion;

means for receiving an indication that a removable system resource has been coupled to said interface subsequent to initialization of said processor, said means for receiving an indication that a removable system resource has been coupled to said interface further including means for identifying an occupied receiving means of the plurality of receiving means, said occupied receiving means coupling said removable system resource to said computer system;

means for copying said device driver stub into said allocated portion of system memory, said means for copying said device driver stub into said allocated portion of system memory copying said device driver stub into a sub-portion corresponding to said occupied receiving means;

means for executing said device driver stub from said system memory;

means for enabling access to said device driver, said access being enabled by said device driver stub, said means for enabling access to said device driver further including means for allowing memory mapping to said device driver residing in said resource memory; and means for executing said device driver from said resource memory.

8. The device as set forth in claim 7 wherein said resource memory further includes a device driver information block (DDIB) header, said device further including means for copying said DDIB header into said sub-portion corresponding to said occupied receiving means.

9. The device as claimed in claim 8 wherein said DDIB header includes link data and a device driver stub unique identification, said device further including means for linking said device driver stub with a different device driver stub stored in system memory.

10. The device as claimed in claim 9 wherein said means for linking said device driver stub further includes means for forward linking said device driver stub with a succeeding device driver stub and backward linking said device driver stub with a preceding device driver stub, said succeeding and preceding device driver stubs residing in system memory.

11. The device as set forth in claim 7 further including:

means for receiving an indication that a removable system resource has been decoupled from said interface; and means for disabling access to said device driver, said access being disabled by said device driver stub.

12. In a computer system having a processor, a system memory, and an interface for receiving a removable system resource, said interface including a plurality of sockets for receiving said removable system resource, a device for dynamically configuring device drivers of removable computer system resources, said device comprising:

a resource memory in said removable system resource, said resource memory comprising a device driver for controlling said removable system resource, said resource memory further including a device driver stub for enabling said device driver;

an allocater for allocating a portion of said system memory, said allocater including means for allocating a plurality of sub-portions of said portion;

a coupling indicator for receiving an indication that a removable system resource has been coupled to said interface subsequent to initialization of said processor, said coupling indicator further including a socket indicator for identifying a receiving socket of the plurality of sockets, said receiving socket coupling said removable system resource to said computer system;

a stub copier for copying said device driver stub into said allocated portion of system memory, said stub copier copying said device driver stub into a sub-portion corresponding to said receiving socket;

a stub executor for executing said device driver stub from said system memory;

a linker for enabling access to said device driver, said access being enabled by said device driver stub, said linker further including a memory mapper for allowing memory mapping to said device driver residing in said resource memory; and a device driver executor for executing said device driver from said resource memory.

13. The device as set forth in claim 12 wherein said resource memory further includes a device driver information block (DDIB) header, said device further including a DDIB header copier for copying said DDIB header into said sub-portion corresponding to said receiving socket.

14. The device as claimed in claim 13 wherein said DDIB header includes link data and a device driver stub unique identification, said device further including stub linker for linking said device driver stub with a different device driver stub stored in system memory.

15. The device as claimed in claim 14 wherein said stub linker further includes chain linker for forward linking said device driver stub with a succeeding device driver stub and backward linking said device driver stub with a preceding device driver stub, said succeeding and preceding device driver stubs residing in system memory.

16. The device as claimed in claim 13 wherein said resource memory further includes a device driver information block (DDIB) header, said DDIB header including link data and a device driver stub unique identification, said device further including:

DDIB copier for copying said DDIB header into said sub-portion corresponding to said receiving socket upon receiving said indication that said removable system resource has been coupled to said interface;

stub linker for linking said device driver stub with a different device driver stub stored in system memory upon receiving said indication that said removable system resource has been coupled to said interface; and stub unlinker for unlinking said device driver stub from said different device driver stub stored in system memory upon receiving said indication that said removable system resource has been decoupled from said interface.

17. The device as set forth in claim 12 further including:

a decoupling indicator for receiving an indication that a removable system resource has been decoupled from said interface; and a disabler for disabling access to said device driver, said access being disabled by said device driver stub.

18. A computer system which dynamically configures device drivers of removable computer system resources, said computer system comprising:

a processor;

a system memory;

an interface for receiving a removable system resource, said interface including a plurality of receiving means for receiving said removable system resource;

a resource memory in said removable system resource, said resource memory comprising a device driver for controlling said removable system resource, said resource memory further including a device driver stub for enabling said device driver;

means for allocating a portion of said system memory, said means for allocating a portion of system memory further including means for allocating a plurality of sub-portions of said portion, said sub-portions equal in number to the number of receiving means, such that each receiving means has a corresponding sub-portion;

means for receiving an indication that a removable system resource has been coupled to said interface subsequent to initialization of said processor, said means for receiving an indication that a removable system resource has been coupled to said interface further including means for identifying an occupied receiving means of the plurality of receiving means, said occupied receiving means coupling said removable system resource to said computer system means for copying said device driver stub into said allocated portion of system memory, said means for copying said device driver stub into said allocated portion of system memory copying said device driver stub into a sub-portion corresponding to said occupied receiving means;

means for executing said device driver stub from said system memory;

means for enabling access to said device driver, said access being enabled by said device driver stub, said means for enabling access to said device driver further including means for allowing memory mapping to said device driver residing in said resource memory; and means for executing said device driver from said resource memory.

19. The computer system as set forth in claim 18 wherein said resource memory further includes a device driver information block (DDIB) header, said computer system further including means for copying said DDIB header into said sub-portion corresponding to said receiving socket.

20. The computer system as set forth in claim 18 further including:

a decoupling indicator for receiving an indication that a removable system resource has been decoupled from said interface; and a disabler for disabling access to said device driver, said access being disabled by said device driver stub.

* * * * *